(12) United States Patent
Tsukamoto

(10) Patent No.: US 10,072,395 B2
(45) Date of Patent: Sep. 11, 2018

(54) SHOVEL AND CONTROL METHOD THEREOF

(71) Applicant: SUMITOMO(S.H.I.) CONSTRUCTION MACHINERY CO., LTD., Tokyo (JP)

(72) Inventor: Hiroyuki Tsukamoto, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/662,435

(22) Filed: Mar. 19, 2015

(65) Prior Publication Data

US 2015/0275483 A1    Oct. 1, 2015

(30) Foreign Application Priority Data

Mar. 27, 2014   (JP) ................. 2014-067213

(51) Int. Cl.
| | |
|---|---|
| *E02F 9/12* | (2006.01) |
| *E02F 9/20* | (2006.01) |
| *E02F 9/22* | (2006.01) |
| *E02F 9/26* | (2006.01) |

(Continued)

(52) U.S. Cl.
CPC ............ *E02F 9/2033* (2013.01); *E02F 3/435* (2013.01); *E02F 9/123* (2013.01); *E02F 9/128* (2013.01); *E02F 9/2282* (2013.01); *E02F 9/2285* (2013.01); *E02F 9/2292* (2013.01); *E02F 9/2296* (2013.01); *E02F 9/262* (2013.01);

(Continued)

(58) Field of Classification Search
None
See application file for complete search history.

(56) References Cited

U.S. PATENT DOCUMENTS

| | | |
|---|---|---|
| 5,198,800 A | 3/1993 | Tozawa et al. |
| 5,490,081 A | 2/1996 | Kuromoto et al. |
| | (Continued) | |

FOREIGN PATENT DOCUMENTS

| | | |
|---|---|---|
| EP | 2685010 | 1/2014 |
| EP | 2716821 | 4/2014 |
| | (Continued) | |

OTHER PUBLICATIONS

EPO Machine Translation Hong KR 20090103088 Sep. 7, 2016.*

(Continued)

*Primary Examiner* — Kevin P Mahne
(74) *Attorney, Agent, or Firm* — IPUSA, PLLC

(57) ABSTRACT

A shovel includes a lower running body and an upper turning body that is turnably provided on the lower running body. An engine is mounted on the upper turning body. A hydraulic pump is driven by the engine to discharge an operating oil. A hydraulic actuator is mounted on the upper turning body. A control device controls operations of the shovel. An entering object detection device detects a position of an entering object in a monitoring area of said shovel and outputs a detection signal indicating the detection position of said entering object. The control device supplies, after a determination of an entry of the entering object into the monitoring area, the operating oil from the hydraulic pump to the hydraulic actuator.

7 Claims, 15 Drawing Sheets

(51) Int. Cl.
*F16P 3/14* (2006.01)
*E02F 3/43* (2006.01)
(52) U.S. Cl.
CPC ............... *F16P 3/141* (2013.01); *F16P 3/142* (2013.01); *F16P 3/147* (2013.01)

(56) References Cited

U.S. PATENT DOCUMENTS

| | | | |
|---|---|---|---|
| 5,598,648 A * | 2/1997 | Moriya | E02F 3/437 37/348 |
| 2012/0315119 A1* | 12/2012 | Magaki | E02F 9/2075 414/685 |
| 2013/0222573 A1* | 8/2013 | Onuma | E02F 9/24 348/82 |
| 2013/0261885 A1 | 10/2013 | Hargrave, Jr. et al. | |
| 2014/0118533 A1* | 5/2014 | Chang | B60R 1/00 348/118 |

FOREIGN PATENT DOCUMENTS

| | | | | |
|---|---|---|---|---|
| EP | 2792798 | | 10/2014 | |
| JP | H04-052330 | | 2/1992 | |
| JP | H05-065725 | | 3/1993 | |
| JP | H05-112973 | | 5/1993 | |
| JP | H05-112976 | | 5/1993 | |
| JP | H06-040066 U | | 5/1994 | |
| JP | 2548978 | | 9/1997 | |
| JP | 2700710 | | 1/1998 | |
| JP | 2003-105807 | | 4/2003 | |
| JP | 2004-044309 | | 2/2004 | |
| JP | 2006-097423 | | 4/2006 | |
| JP | 2011-052383 | | 3/2011 | |
| JP | 2013-021290 | | 1/2013 | |
| JP | 2013-189767 | | 9/2013 | |
| KR | 20090103088 | * | 10/2009 | ................ E02F 9/20 |
| KR | 20100073477 | * | 7/2010 | ................ E02F 9/00 |
| WO | 2012/161062 | | 11/2012 | |
| WO | 2013089285 | | 6/2013 | |

OTHER PUBLICATIONS

EPO Machine Translation Kim KR 20100073477 Sep. 8, 2016.*
Staff Report, Engineering Essentials: Hydraulic Motor Circuits, Jan. 1, 2012, Hydraulics & Pneumatics.*

* cited by examiner

US 10,072,395 B2

SHOVEL AND CONTROL METHOD THEREOF

CROSS-REFERENCE TO RELATED APPLICATION

The present application is based on and claims the benefit of Japanese Patent Application No. 2014-067213 filed on Mar. 27, 2014, the entire contents of which are incorporated herein by reference.

BACKGROUND

Technical Field

The present invention relates to a shovel having a turning body mounted on a running body, and a control method thereof.

Description of Related Art

In the technical field of construction machines such as a shovel having a turning body that is turnably mounted on a running body, there is known a technique to stop a turning operation of the turning body when an entering object enters a turning range. This kind of shovel stops the turning operation of the turning body by shutting off the supply of operating oil to a turning hydraulic motor.

However, it is difficult for the above-mentioned shovel to stop the turning body immediately after shutting off the supply of operating oil to the turning hydraulic motor due to a moment of inertia. This is because an attachment having a large moment of inertia is attached to the turning body of the shovel, which causes the moment of inertia of the turning body to become large. That is, the large moment of inertia of the attachment causes the turning body to be difficult to make an immediate stop.

Thus, it is desirous to develop a technique to reliably avoid a contact between a shovel and an entering object when the entering object enters a monitoring range of the shovel.

SUMMARY

According to an aspect of the invention, there is provided a shovel including a lower running body and an upper turning body that is turnably provided on the lower running body. An engine is mounted on the upper turning body. A hydraulic pump is driven by the engine to discharge an operating oil. A hydraulic actuator is mounted on the upper turning body. A control device controls operations of the shovel. An entering object detection device detects a position of an entering object in a monitoring area of the shovel and outputs a detection signal indicating the detection position of the entering object. The control device supplies, after a determination of an entry of the entering object into the monitoring area, the operating oil from the hydraulic pump to the hydraulic actuator.

There is provided according to another aspect of the invention a control method of a shovel that includes a control device that controls operations of the shovel, and an entering object detection device that detects a position of an entering object that has entered a monitoring area of the shovel. The control method includes determining an entry of the entering object into the monitoring area based on a detection signal from the entering object detection device; and supplying an operating oil from a hydraulic pump to a hydraulic actuator after the determination of an entry of the entering object.

The object and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Figure 1:
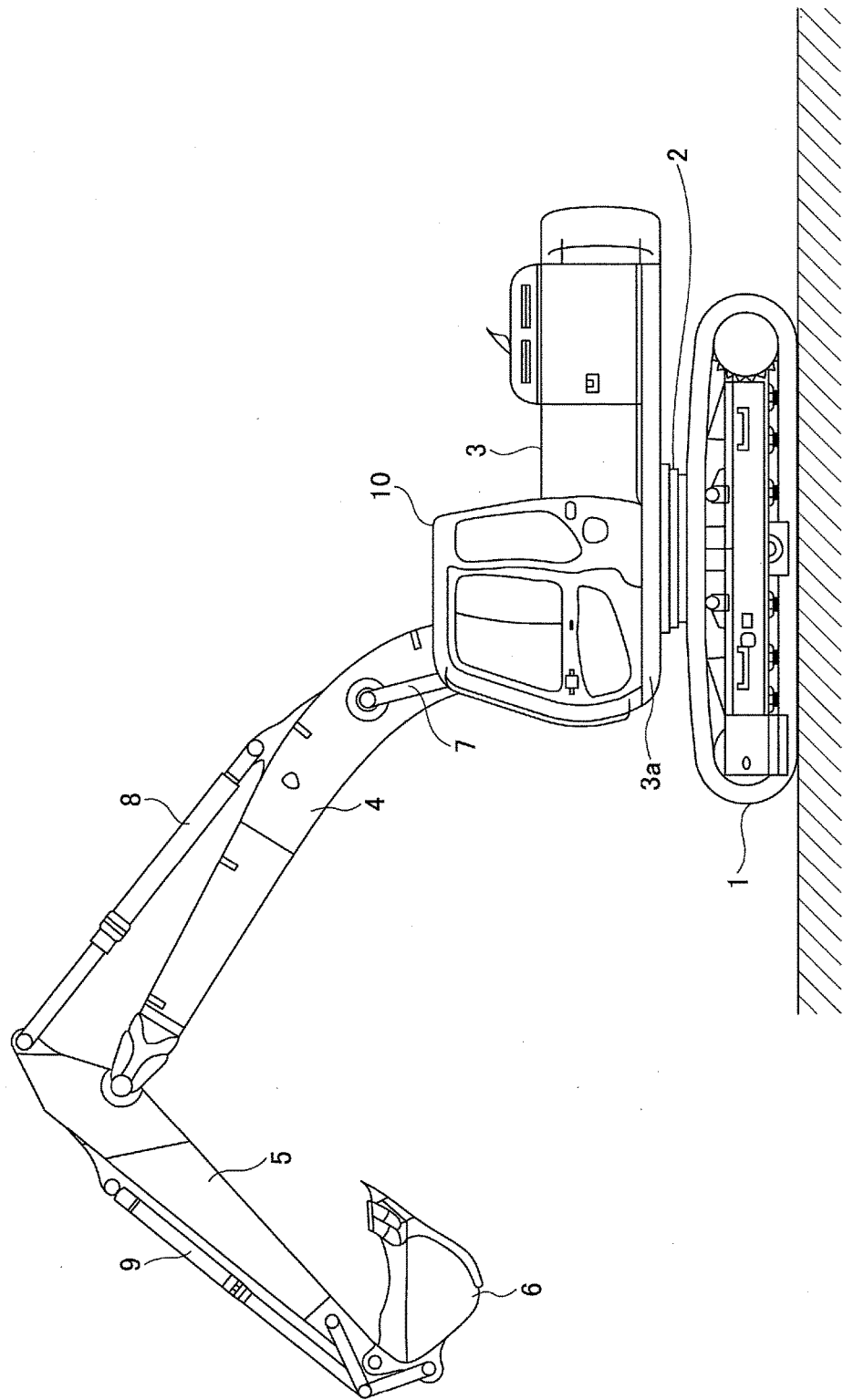
FIG. 1 is a side view of a shovel according to an embodiment of the present invention.

First, a description will be given, with reference to FIG. 1, of a shovel according to an embodiment of the present invention. FIG. 1 is a side view of the shovel according to the embodiment. The shovel illustrated in FIG. 1 includes a lower running body 1 and an upper turning body 3 that is mounted on the lower running body 1 via a turning mechanism 2. A boom 4 is mounted to the upper turning body 3. An arm 5 is attached to an extreme end of the boom 4, and the bucket 6 is attached to an extreme end of the arm 5. The boom 4, arm 5 and bucket 6 (corresponding to an attachment 125 mentioned later) are hydraulically driven by a boom cylinder 7, an arm cylinder 8 and a bucket cylinder 9, respectively. The upper turning body 3 is provided with a cabin 10 and also mounted with a power source such as an engine 11 or the like. The cabin 10 is provided with a driver's seat so that a driver can operate the shovel while sitting in the driver's seat.

Figure 2:
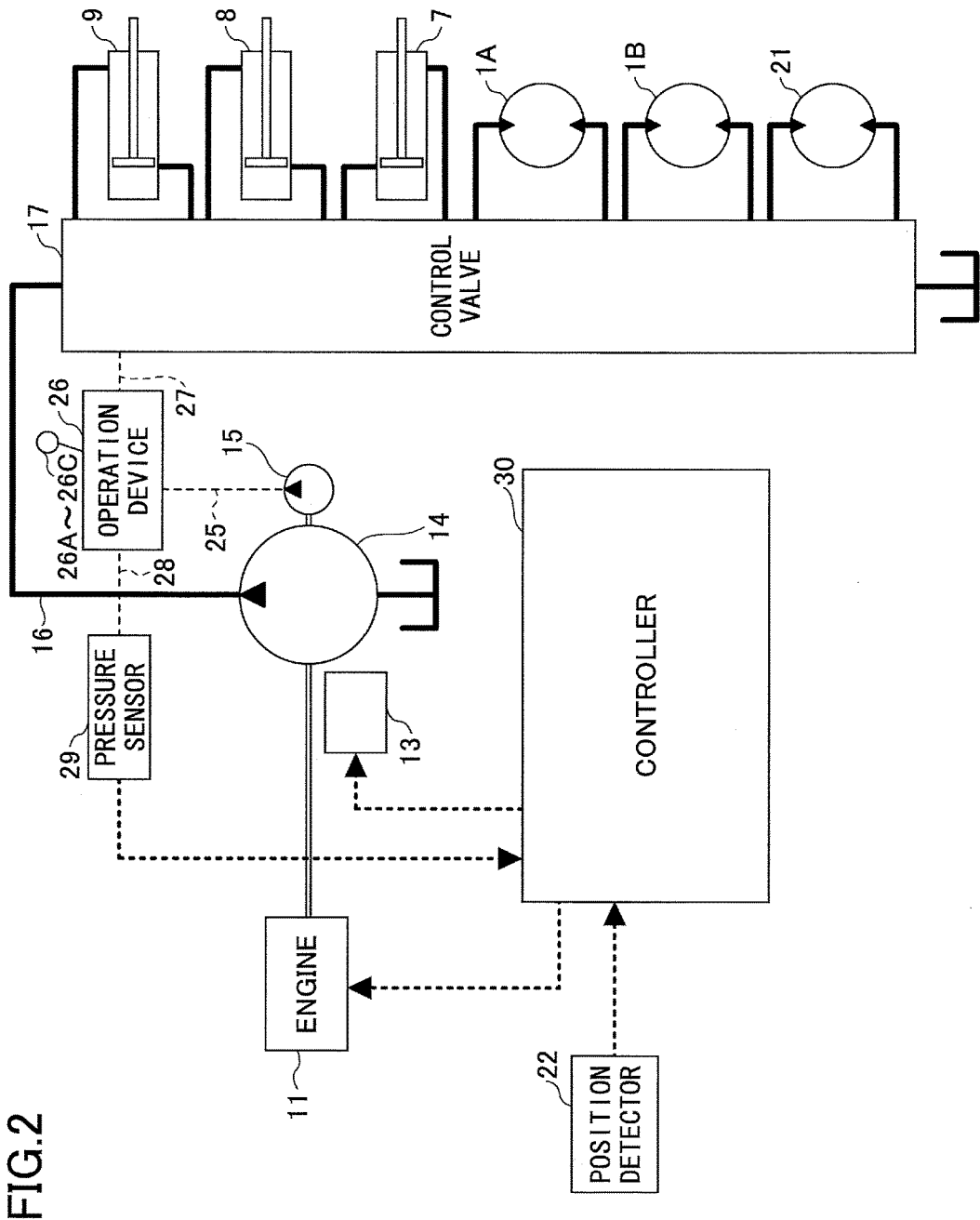
FIG. 2 is a block diagram illustrating a configuration of a drive system of the shovel illustrated in FIG. 1.

FIG. 2 is a block diagram illustrating a structure of a drive system of the shovel illustrated in FIG. 1. In FIG. 2, double lines denote a mechanical drive system, bold solid lines denote high-pressure hydraulic lines, thin dashed lines denote pilot lines, and bold dotted lines denote electric drive/control lines.

The drive system of the shovel mainly includes an engine 11, a regulator 13, a main pump 14, a pilot pump 15, a control valve 17, an operation device 26, a pressure sensor 29, and a controller 30.

The engine 11 is a power source of the shovel, which, for example, operates to maintain a predetermined revolution speed. The output axis of the engine 11 is connected to the input axis of the main pump 14.

The main pump 14 is a hydraulic pump for supplying operating oil to the control valve 17 through a high-pressure hydraulic line, and is, for example, a swash plate type variable capacity hydraulic pump. The main pump 14 discharges the operating oil by the revolution power of the engine 11.

The regulator 13 is a device for controlling an amount of discharge of the main pump 14. The regulator 13 controls an amount of discharge of the main pump 14 by, for example, adjusting a swash plate inclination angle of the main pump 14 in response to a discharge pressure of the main pump 14 or a control signal from the controller 30.

The pilot pump 15 is a hydraulic pump for supplying operating oil to various hydraulically controlled devices through a pilot line, and is, for example, a fixed capacity hydraulic pump. The pilot pump 15 is connected with an operation device 26 through a pilot line 25.

The control valve 17 is a hydraulic control device for controlling a hydraulic system in the shovel. The boom cylinder 7, the arm cylinder 8, the bucket cylinder 9, a running hydraulic motor 1A (right), a running hydraulic motor 1B (left) and a turning hydraulic motor 21 are connected to the control valve 17 through high-pressure hydraulic lines. The control valve 17 selectively supplies operating oil discharged by the main pump 14 to one or more of the boom cylinder 7, the arm cylinder 8, the bucket cylinder 9, the running hydraulic motor 1A (right), the running hydraulic motor 1B (left) and the turning hydraulic motor 21. In the following description, the boom cylinder 7, the arm cylinder 8, the bucket cylinder 9, the running hydraulic motor 1A (left), the running hydraulic motor 1B (right) and the turning hydraulic motor 21 may be collectively referred to as the "hydraulic actuators".

The operation device 26 includes a lever 26A, a lever 26B and a pedal 26C. The levers 26A, 26B and 26C are connected to the control valve 17 and a pressure sensor 29 through pilot lines 27 and 28, respectively. The pressure sensor 29 is connected to a controller 30 that performed a drive control of an electric system. In the present embodiment, the lever 26A serves as both a turning lever and an arm lever. The lever 26B serves as both a boom lever and a bucket lever.

The operation device 26 is used by an operator to operate the hydraulic actuators. The operation device 26 supplies the pressurized operating oil, which is received from the pilot pump 15, to pilot ports of the flow control valve corresponding to the respective hydraulic actuators. The pressure of the pressurized operating oil supplied to the pilot port of each of the flow control valve corresponds to a direction of operation and an amount of operation of the respective one of the levers 26A and 26B and pedal 26C of the operation device 26 corresponding to the respective one of the hydraulic actuators.

The turning hydraulic motor 21 is connected to the control valve 17 to drive the turning mechanism 2. Although the turning hydraulic motor 21 is connected to the control valve 17 through a hydraulic circuit of a turning control device, the hydraulic circuit of the turning drive device is not illustrated in FIG. 2. The turning drive device will be described later.

The pressure sensor 29 is a sensor to detect an operation by the operator applied to the operation device 26. For example, the pressure sensor 29 detects, in the form of pressure, a direction of operation and an amount of operation applied to the lever 26A or 26B or the pedal 26C of the operation device 26 corresponding to the respective one of the hydraulic actuators, and outputs the value of the detected pressure to the controller 30.

The controller 30 is a control device for controlling the shovel, and is constituted by, for example, a computer equipped with a CPU (Central Processing Unit), a RAM (Random Access Memory), a ROM (Read Only Memory), etc. The controller 30 is materialized by the CPU executing a drive control program stored in the internal memory.

Specifically, the controller 30 receives the detected value output by a position detector 22, the pressure sensor 29, etc., and performs an avoiding operation of the upper turning body 3 or the attachment based on the output values of these sensors. The position detector 22 will be mentioned later.

Figure 3:
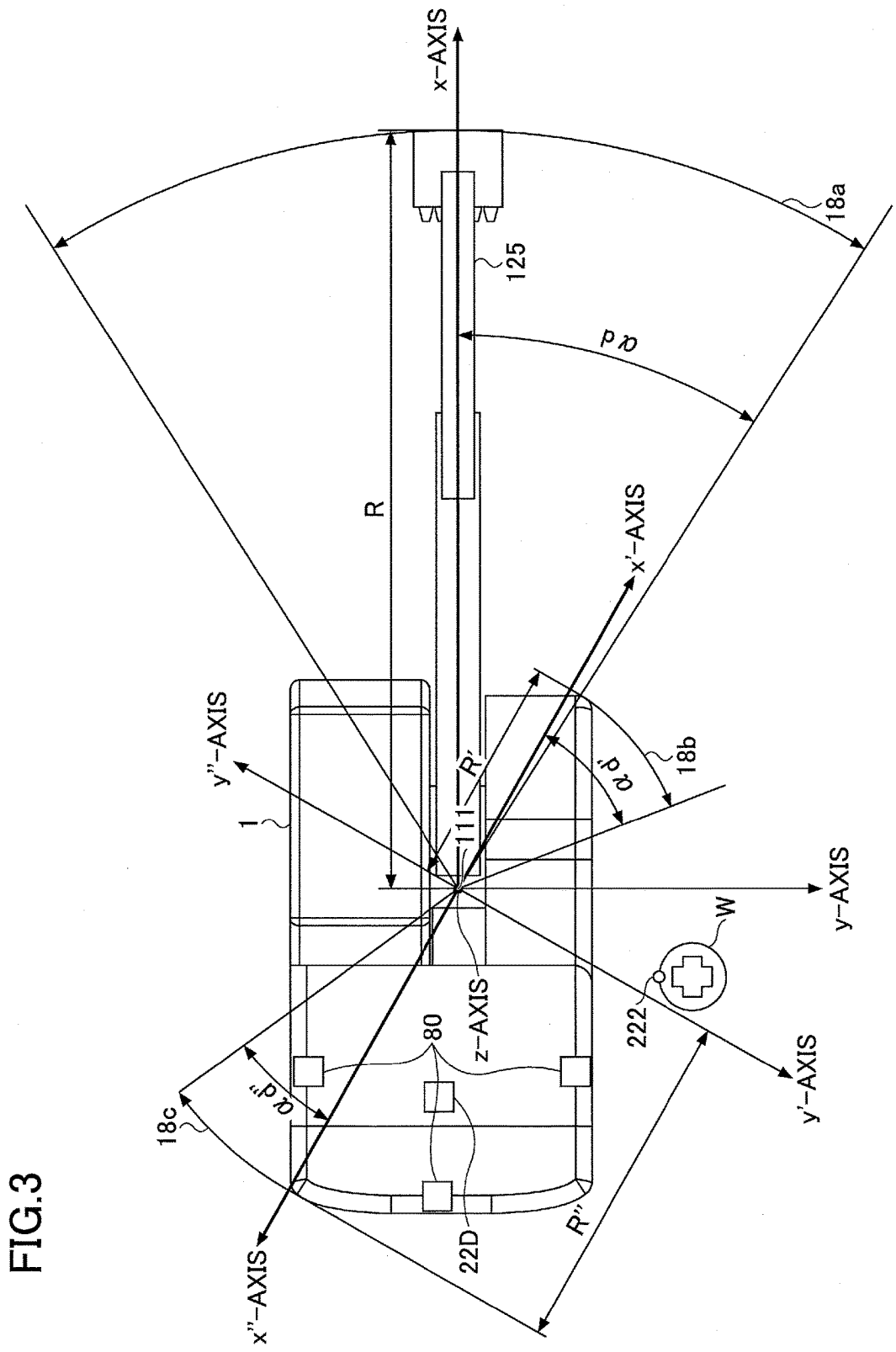
FIG. 3 is a plan view of the shovel and an entering object with illustration of monitoring areas.

A description is given, with reference to FIG. 3, of a positional relationship between the shovel and an entering object. FIG. 3 is a plan view of the shovel illustrated in FIG. 1 and an entering object (worker).

The position detector 22 (refer to FIG. 2) includes a boom angle sensor 22A, an arm angle sensor 22B and a bucket cylinder stroke sensor 22C (these sensors are not illustrated in FIG. 3).

A turning angle sensor 22D is attached to the upper turning body 3. The turning angle sensor 22D measures a turning angles of the upper turning body 3 or the attachment 125 from first through third directions.

For example, a forward direction of the running direction of the lower running body 1 is set to the first reference direction. When the lower running body 1 is placed on a reference horizontal plane, an xyz-coordinates system is defined wherein a direction from a turning center 111 toward a remote end of the attachment 125 in the reference horizontal plane is defined as x-axis, a direction perpendicular to x-direction in the reference horizontal plane is defined as y-direction, and the turning center 111 is defined as z-axis.

A first monitoring area 18a is defined by a fan-shaped area having a center as the turning center 111 (z-axis). The first monitoring area 18a is symmetric, in a plan view, with respect to the center line of the attachment 125. A half (½) of the center angle of the first monitoring area 18a is referred to as the "first monitoring angle upper limit value αd".

A distance R from the turning center to the attachment 125 (hereinafter, referred to as the "attachment length" fluctuates when swinging the boom 4, arm 5 and bucket 6. The radius of the first monitoring area 18a is equal to the attachment length R.

A line extending from the turning center 111 and passing through a front corner of the upper turning body 3 is defined as the second reference direction. An x'y'z-coordinates system is defined wherein a direction of the line extending from a turning center 111 and passing through the front corner of the upper turning body 3 in the reference horizontal plane is defined as x'-direction and a direction perpendicular to x'-direction in the reference horizontal plane is defined as y'-direction. The radius of a second monitoring area 18*b* is defined as R'.

The second monitoring area 18*b* is defined by a fan-shaped area having a center as the turning center 111 (z-axis). The second monitoring area 18*b* is symmetric, in a plan view, with respect to x'-axis. A half (½) of the center angle of the second monitoring area 18*b* is referred to as the "second monitoring angle upper limit value αd'".

A line extending from the turning center 111 and passing through a rear corner of the upper turning body 3 is defined as the third reference direction. An x"y"z-coordinates system is defined wherein a direction of the line extending from a turning center 111 and passing through the rear corner of the upper turning body 3 in the reference horizontal plane is defined as x"-direction and a direction perpendicular to x"-direction in the reference horizontal plane is defined as y"-direction. The radius of a third monitoring area 18*c* is defined as R".

The third monitoring area 18*c* is defined by a fan-shaped area having a center as the turning center 111 (z-axis). The third monitoring area 18*c* is symmetric, in a plan view, with respect to x"-axis. A half (½) of the center angle of the third monitoring area 18*c* is referred to as the "third monitoring angle upper limit value αd'"".

The first through third monitoring areas 18*a*, 18*b* and 18*c* can be set arbitrarily.

The upper turning body 3 is attached with, for example, to total of three entering object detection devices 80 on the rear and left and right. When an entering object (for example, an entering person or worker W) enters the monitoring area of the shovel, a transmitter 222 is attached to a predetermined position of the entering person at the entrance. The transmitter 222 is removed from the worker when the worker goes out of the monitoring area (work area). For example, an omnidirectional marker light emitter is used as the transmitter 222. For example, a CCD camera for capturing an image of the transmitter is used as each of the entering object detection device 80. A position of the transmitter 222 can be calculated by taking the image of the transmitter 22 by a plurality of entering object detection devices 80. Because the entering object detection devices 80 are attached to the upper turning body 3, the calculated position of the transmitter 222 is detected as a relative position to the upper turning body 3. Each of the entering object detection devices 80 is not limited to the CCD camera, and a laser radar, millimeter-wave laser, ultrasonic sensor, infrared sensor, etc., may be used. Any kind of detector can be used if it can detect the entering person W.

Figure 4:
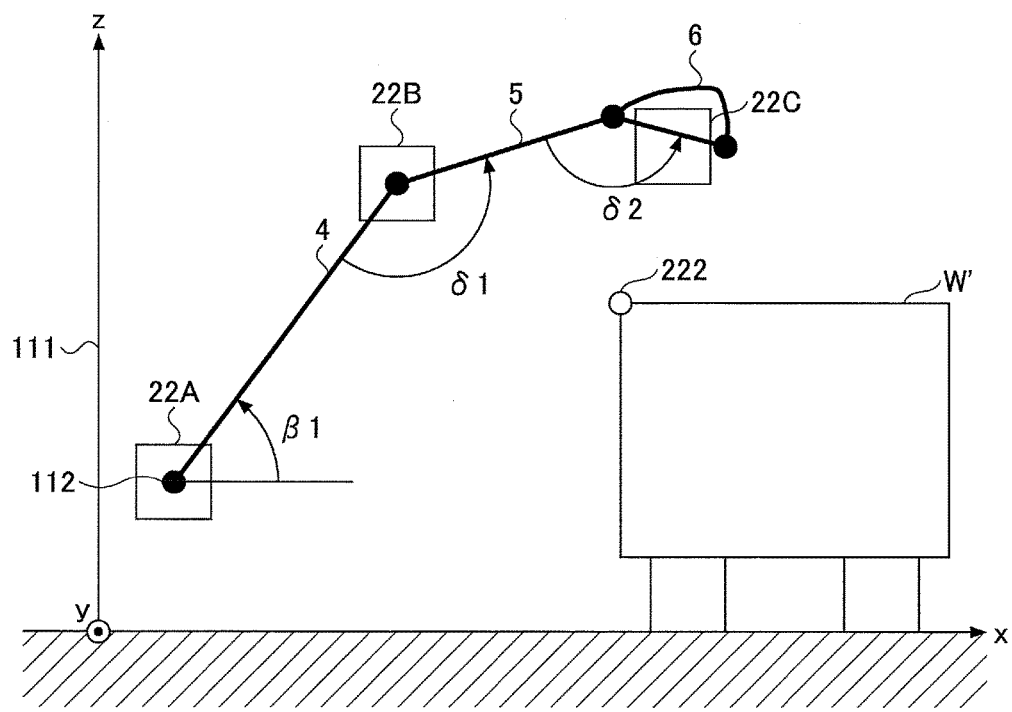
FIG. 4 is an illustration indicating a positional relationship between the shovel and the entering object.

FIG. 4 is an illustration indicating a positional relationship in a height direction and a transverse direction between the shovel illustrated in FIG. 1 and the entering object.

The transmitter 222 is attached to the highest position of a load-carrying tray of a dump truck W' as the entering object. The boom 4 swings u and down about a swing center 112, which is parallel to y-axis. The boom angle sensor 22A and the arm angle sensor 22B as the position detector 22 are attached to the connecting part between the upper turning body 3 and the boom 4 and the connecting part between the boom 4 and the arm 5, respectively. The bucket cylinder 9 is attached with the bucket cylinder stroke sensor 22C as the position detector 22. The boom angle sensor 22A measures an angle β1 formed between the longitudinal direction of the boom 4 and the reference horizontal plane (xy-plane). The arm angle sensor 22B measures an angle δ1 formed between the longitudinal direction of the boom 4 and the longitudinal direction of the arm 5. The bucket cylinder stroke sensor 22C measures an angle δ2 formed between the longitudinal direction of the aria 5 and the longitudinal direction of the bucket 6 based on a stroke of the bucket cylinder 9.

Here, the longitudinal direction of the boom 4 is a direction of a line passing through the swing center 112 and the connecting part between the boom 4 and the arm 5 in a plane (zx-plane) perpendicular to the swing center 112. The longitudinal direction of the arm 5 is a direction of a line passing through the connecting part between the boom 4 and the arm 5 and the connecting part between the arm 5 and the bucket 6 in zx-plane. The longitudinal direction of the bucket 6 is a direction of a line passing through the connecting part between the arm 5 and the bucket 6 and an extreme end of the bucket 6 in zx-plane.

The swing center 112 is located at a position displaced from the turning center 111 (z-axis). A structure in which the turning center 111 and the swing center 112 intersect with each other may be made.

Figure 5:
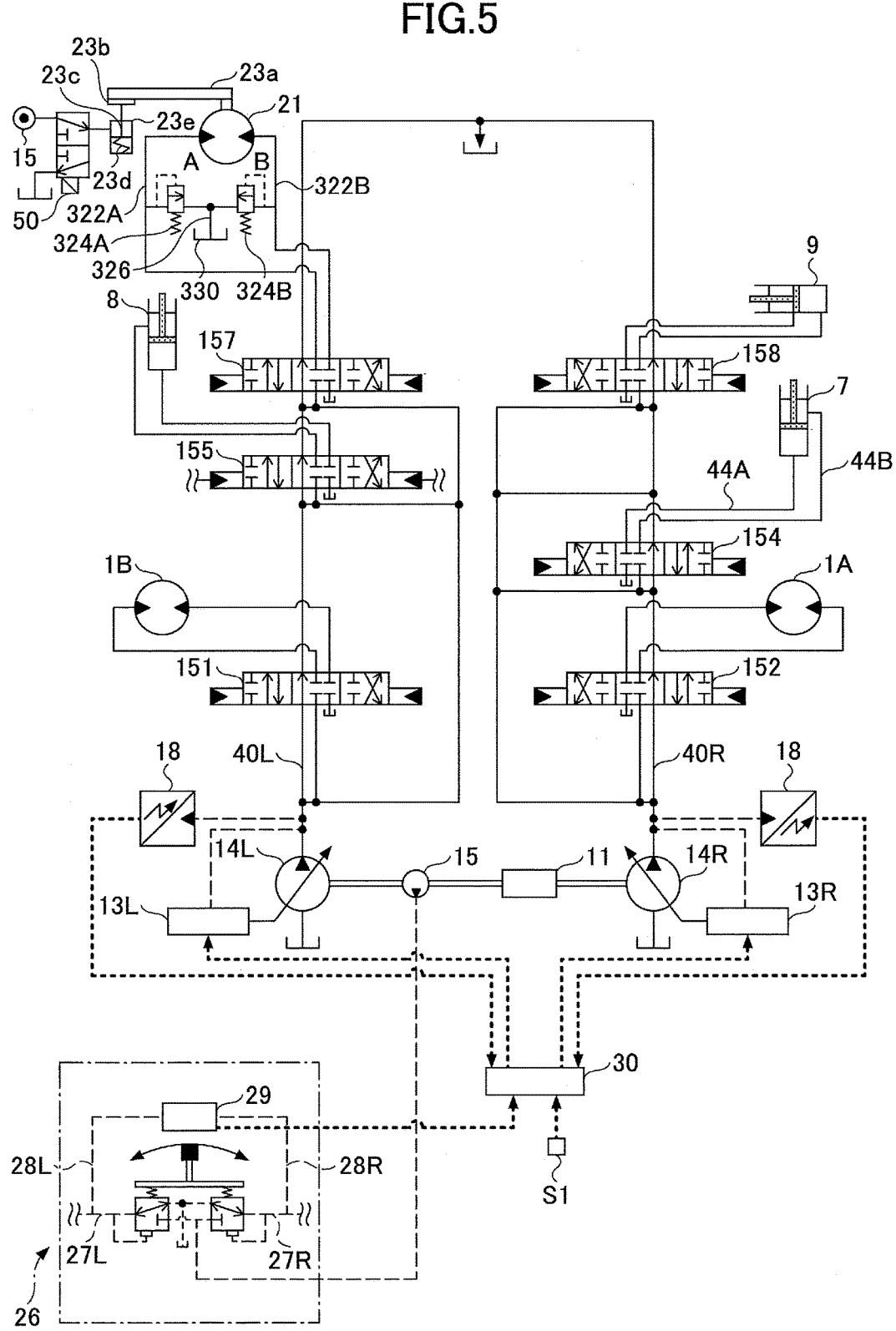
FIG. 5 is a circuit diagram of a hydraulic system of the shovel.

A description is given, with reference to FIG. 5, of a hydraulic system of the shovel according to the present embodiment. FIG. 5 illustrates a structure of the hydraulic system mounted to the shovel according to the present embodiment illustrated in FIG. 1. In FIG. 5, double lines denote a mechanical power system, solid lines denote high-pressure hydraulic lines, dashed lines denote pilot lines, and dotted lines denoted an electric control system.

In FIG. 5, the hydraulic system causes the operating oil to circulate from the main pumps 14L and 14R, which are driven by the engine 11, to an operating oil tank through center bypass pipe paths 40L and 40R, respectively.

The center bypass pipe path 40L is a high-pressure hydraulic line passing through flow control valves 151, 155 and 157. The center bypass pipe path 40R is a high-pressure hydraulic line passing through flow control valves 152, 154 and 158.

The operation device 26 is used for operating the shovel. The operation device 26 supplies a control pressure corresponding to a lever operation amount to one of left and right pilot ports of the flow control valve using the operating oil discharged by the pilot pump 15.

The pressure sensor 29 detects operation contents of the operator to the operation device 26 by a form of pressure, and outputs the detected value to the controller 30. The operation contents are, for example, a lever operation direction, a lever operation amount (lever operation angle), etc.

The operation device 26 includes the operation levers, a remote control valve and the pressure sensor 29. The operating oil discharged from the pilot pump 15 is supplied to the remote control valve. Pilot lines 28R and 28L are connected to the pilot lines 27R and 27L extending from the remote control valve. The other ends of the pilot lines 28R and 28L are connected to the pressure sensor 29.

The flow control valve 151 is a spool valve that switches a flow of the operating oil in order to supply the operating oil discharged from the main pump 14L to the running hydraulic motor 1B. The flow control valve 152 is a spool valve that switches a flow of the operating oil in order to supply the operating oil discharged from the main pump 14R to the running hydraulic motor 1A.

The flow control valve 154 is a spool valve that switches a flow of the operating oil in order to supply the operating oil discharged from the main pump 14R to the boom cylinder 7 and discharge the operating oil in the boom cylinder 7 to the operating oil tank.

The flow control valve 155 is a spool valve that switches a flow of the operating oil in order to supply the operating oil discharged from the main pump 14L to the arm cylinder 8 and discharge the operating oil in the arm cylinder 8 to the operating oil tank.

The flow control valve 157 is a spool valve that switches a flow of the operating oil in order to circulate the operating oil discharged from the main pump 14L through the turning hydraulic motor 21.

The flow control valve 158 is a spool valve that switches a flow of the operating oil in order to supply the operating oil discharged from the main pump 14R to the bucket cylinder 9 and discharge the operating oil in the bucket cylinder 9 to the operating oil tank.

A description is given of a turning drive device that controls a drive of the turning hydraulic motor 21. The turning drive device includes a hydraulic circuit for driving the turning hydraulic motor 21. The hydraulic circuit of the turning drive device is provided between the turning hydraulic motor 21 and the control valve 17.

When the high-pressure operating oil is supplied to an A port of the turning hydraulic motor 21 from the flow control valve 157 through a hydraulic line 322A, the turning hydraulic motor 21 rotates in a predetermined direction. The high-pressure operating oil supplied to the A port drives the turning hydraulic motor 21 and turns into the low-pressure operating oil, and discharged from a B port and returns to the flow control valve 157 through a hydraulic line 322B. On the other hand, when the high-pressure operating oil is supplied to the B port of the turning hydraulic motor 21 from the flow control valve 157 through a hydraulic line 322B, the turning hydraulic motor 21 rotates in a reverse direction. The high-pressure operating oil supplied to the B port drives the turning hydraulic motor 21 and turns into the low-pressure operating oil, and discharged from the A port and returns to the flow control valve 157 through a hydraulic line 322A.

A rotation axis of the turning hydraulic motor 21 is connected to the turning mechanism 2 via a transmission (not illustrated in the figure). The turning mechanism is operated by the turning hydraulic motor 21 being driven to rotate, which causes the upper turning body 3 to turn. The upper turning body 3 is turned in a rightward direction by rotating the turning hydraulic motor 21 in one direction, and the upper turning body 3 is turned in a leftward direction by rotating the turning hydraulic motor 21 in an opposite direction.

The hydraulic line 322A is connected with a hydraulic pressure supply port of a relief valve 324A. A hydraulic pressure release port of the relief valve 324A is connected to a hydraulic line 326. The hydraulic line 326 is a line through which the low-pressure operating oil flows to return to the operating oil tank 330. Similarly, the hydraulic line 322B is connected with a hydraulic pressure supply port. A hydraulic pressure release port of the relief valve 324B is connected to the hydraulic line 326.

A brake plate 23a is attached to the output axis of the turning hydraulic motor 21. A cylinder 23e that is equipped with a brake disc 23b, a piston 23c and a spring 23d is provided near the end of the brake plate 23a. The cylinder 23e is configured to release a braking force of the brake when the operating oil is supplied from the pilot pump 15 and actuate the brake when the supply of the operating oil from the pilot pump 15 is stopped. The supply of the operating oil is controlled by a solenoid switching valve 50.

The regulators 13L and 13R constituting the regulator 13 adjust the swash plate angles of the main pumps 14L and 14R in response to discharge pressures of the main pumps 14L and 14R, respectively.

The controller receives the output of the pressure sensor 29, and outputs, if necessary, a control signal to the regulators 13L and 13R so as to change discharge amounts of the main pumps 14L and 14R.

A switch S1 connected to the controller 30 switches activation/stop of each of the main pumps 14L and 14R. The switch S1 is provided in the cabin 10.

When the controller 30 determines that an entering object, such as an entering person W, a dump truck W', etc., exists in the monitoring area (first through third monitoring areas 18a, 18b and 18c), the controller 30 controls the shovel to avoid a contact between the entering object and the shovel.

Figure 6:
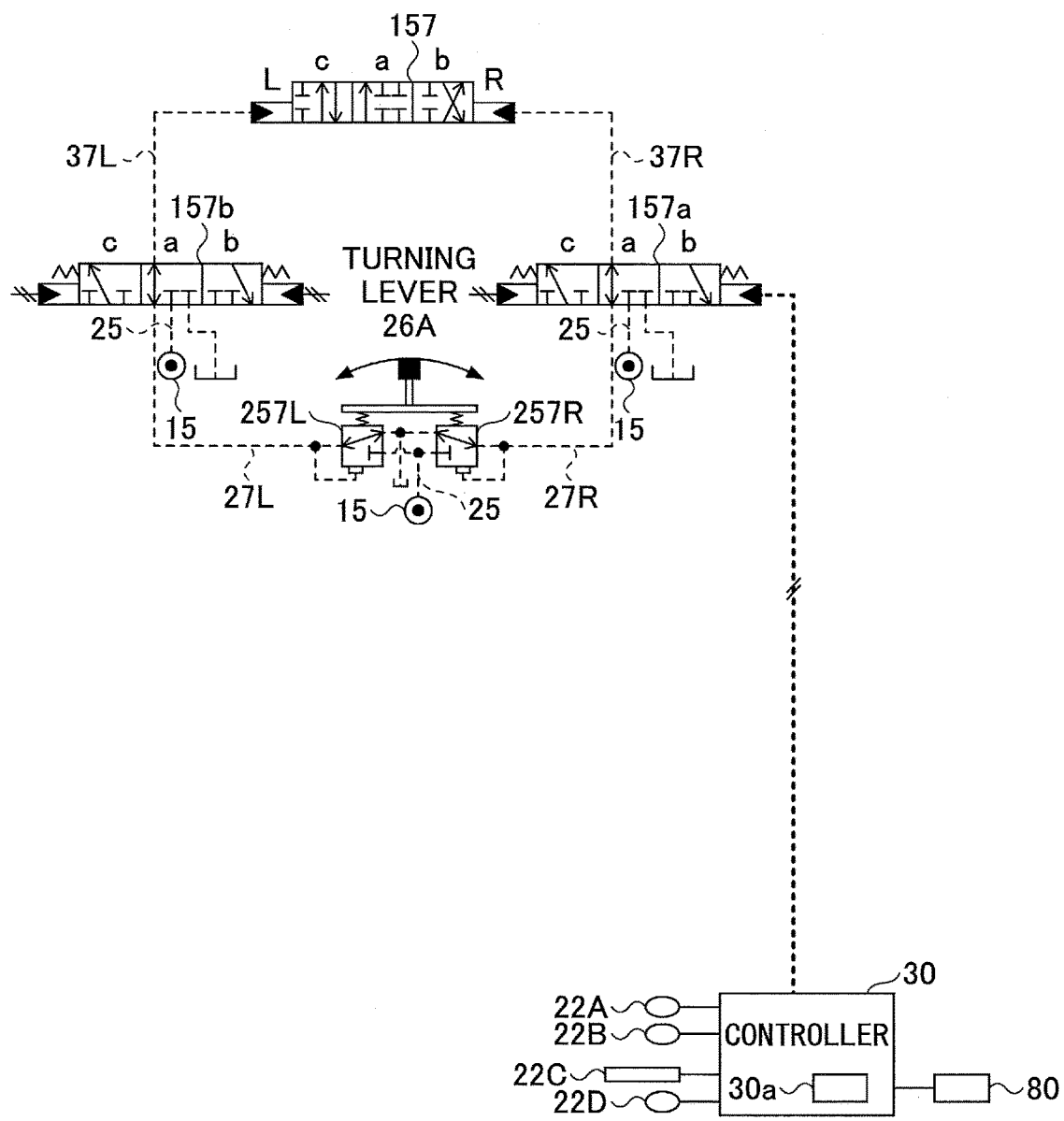
FIG. 6 is a hydraulic circuit diagram of a hydraulic circuit provided in the hydraulic system illustrated in FIG. 5.

FIG. 6 is a hydraulic circuit diagram of the hydraulic circuit provided between the operation lever and the flow control valve in the hydraulic system illustrated in FIG. 5. A description is given of a hydraulic circuit provided between the turning lever 26A and the flow control valve 157.

The pilot pump 15 generates a pilot pressure necessary for the hydraulic operating system. The generated pilot pressure is supplied to the turning lever 26A through the pilot line 25. The turning lever 26A is operated by an operator. The turning lever 26A converts a primary side hydraulic pressure supplied from the pilot line 25 into a secondary side hydraulic pressure. The secondary side hydraulic pressure is transmitted to solenoid proportional valves 157a and 157b through pilot lines 27R and 27L, and also transmitted to the R port or L port of the flow control valve 157 through pilot lines 37R and 37L.

The operation device for turning is constituted by the turning lever 26A and remote control valves 257R and 257L.

Each of the remote control valves 257R and 257L is a valve for outputting a pilot pressure corresponding to an operation amount of the turning lever 26A to the flow control valve 157. The solenoid proportional valves 157a and 157b are arranged between the turning lever 26A and the flow control valve 157.

Specifically, the remote control valve 257R is connected to the R port of the flow control valve 157 by the pilot lines 27R and 37R via the solenoid proportional valve 157a. The remote control valve 257L is connected to the L port of the flow control valve 157 by the pilot lines 27L and 37L via the solenoid proportional valve 157b. Each of the remote control valves 257R and 257L receives a pressure of the operating oil supplied by the pilot pump 15 as a primary pressure, and outputs a secondary pressure corresponding to an operation amount of the turning lever 26A as a pilot pressure.

The pilot pressure input to the flow control valve 157 is switched by the solenoid proportional valves 157a and 157b.

Specifically, the solenoid proportional valve 157a is a 4-port 3-position valve. A first port of the solenoid proportional valve 157a is connected to the R port of the flow control valve 157 through the pilot line 37R. A second port of the solenoid proportional valve 157a is connected to the remote control valve 257R through the pilot line 27R. A third port of the solenoid proportional valve 157a is connected to the pilot pump 15 through the pilot line 25. A fourth port of the solenoid proportional valve 157a is connected to the tank.

Similar to the solenoid proportional valve 157a, the solenoid proportional valve 157b is also a 4-port 3-position valve. The connection relationship of first port through fourth port is basically the same as the connection relationship of the solenoid proportional valve 157a, and a description thereof will be omitted.

Each of the solenoid proportional valves 157a and 157b switches the secondary pressure of the operating oil discharged by the pilot pump 15 so as to switch the flow control valve 157 according to a signal supplied from the controller 30.

When the solenoid proportional valve 157a is at a neutral position, the pilot line 27R is set in a communicated state with the pilot line 37R. Thus, if the operator operates the turning lever 26A in a rightward turning direction, the secondary pressure of the operating oil discharged by the pilot pump 15 is supplied to the R port of the flow control valve 157 through the first and second ports of the solenoid proportional valve 157. Then, the flow control valve 157 is switched from the neutral position a to a right side position b. Thereby, the center bypass pipe path 40L is set in the communicated state with the hydraulic line 322B, and a discharge side port of the main pump 14L is set in the communicated state with the B port of the turning hydraulic motor 21 (refer to FIG. 5). Thus, the high-pressure operating oil discharged from the main pump 14L is supplied to the B port of the turning hydraulic motor 21, and the turning hydraulic motor 21 turns in the rightward turning direction, which changes the high-pressure operating oil into a low-pressure operating oil. The low-pressure operating oil is discharged from the A port of the turning hydraulic motor 21, and returns to the flow control valve 157 through the hydraulic line 322A. In this case, the B port serves as a suction side port, and the A port serves as a discharge side port.

When the operator intends to decelerate or stop the turning operation of the upper turning body 3, the operator returns the turning lever 26A to the neutral position, which causes the center bypass pipe path 40L to be set in the non-communicated state with the hydraulic line 322B. That is, the discharge side port of the main pump 14L is set in the communicated state with the B port of the turning hydraulic motor 21. Then, the supply of the high-pressure operating oil from the main pump 14L to the turning hydraulic motor 21 is stopped. When the flow control valve 157 is closed, the operating oil is not supplied from the main pump 14L to the flow control valve 157 and the operating oil discharged from the A port of the turning hydraulic motor 21 cannot return to the tank via the flow control valve 157.

A description is given of a case where the hydraulic circuit is not provided with the solenoid proportional valves 157a and 157b in the pilot lines 27R and 27L, respectively. When the flow control valve is set in the neutral position a to set the center bypass pipe path 40L and the hydraulic line 322B in the non-communicated state with each other, which causes the supply of the operating oil from the main pump 14L to the flow control valve 157 to stop, the hydraulic pressure at the discharge side A port, which is at a low pressure, is increased. Thereafter, when the pressure of the operating oil at the discharge side port exceeds a relief pressure previously set by the relief valve 324A, the operating oil returns to the tank via the hydraulic line 326. Thereby, a braking force is generated by the relief valve 324A, but the pressure at the discharge side A port decreases because there is no operating oil supplied to the supply side B port. As a result, the braking force is decreased, which causes a time period from the deceleration to the stop of the upper turning body 3.

Thus, according to the present embodiment, the solenoid proportional valves are provided to shorten the time period from the deceleration to the stop of the upper turning body 3. In order to do that, the flow of the operating oil from the main pump 14L is automatically switched irrespective of or irrelevant to the lever operation by the operator. Thereby, a large braking force is applied continuously to the turning hydraulic motor 21, which permits a faster stop of the turning operation of the upper turning body 3.

Here, a consideration is given of a case where the controller 30 detects an entering object while the upper turning body 3 is turning in the rightward direction.

The turning operation of the upper turning body 3 in the rightward direction can be performed by the operator operating the turning lever 26A to the right turn side, which causes a pilot pressure corresponding to the operation amount of the turning lever 26A to be supplied to the R port of the flow control valve 157 through the solenoid proportional valve 157a. Thereby, the center bypass pipe path 40L and the hydraulic line 322B are set in the communicated state, and the discharge side port of the main pump 14L is set in the communicated state with the B port of the turning hydraulic motor 21 (refer to FIG. 5). Thus, the flow control valve 157 is switched to the right side position b, and the high-pressure operating oil discharged by the main pump 14L is supplied to the B port of the turning hydraulic motor 21. The operating oil supplied to the turning hydraulic motor 21 is discharged from the A port so that the turning hydraulic motor 21 performs the rightward turning operation. At this time, the solenoid proportional valves 157a and 157b are at the neutral position a.

If the controller 30 detects an entering object, the controller 30 switches the solenoid proportional valve 157a from the neutral position a to the right side position b and also switches the solenoid proportional valve 157b from the neutral position a to the left side position c. A predetermined signal pattern is previously stored in the internal memory of the controller 30. The controller 30 outputs a control signal to the solenoid proportional valves 157a and 157b based on the predetermined signal pattern. Thereby, the pilot line 37R is set in the communicated state with the tank port, and the pilot line 25 is set in the communicated state with the pilot line 37L. Accordingly, by switching the solenoid proportional valve 157a from the neutral position a to the right side position b, the pilot line 37R is open to the tank, which causes the pressure in the pilot line 37 to become a low pressure. Additionally, by switching the solenoid proportional valve 157a from the neutral position a to the left side position c, the secondary pressure of the operating oil discharged from the pilot pump 15 is supplied to the L port of the flow control valve 157.

Accordingly, a pressure difference is generated between the R port and L port of the flow control valve 157 and the flow control valve 157 is switched to the left side position c, which causes the discharge side port of the main pump 14L and the A port of the turning hydraulic motor 21 to be set in the communicated state (refer to FIG. 5). Thus, the high-pressure operating oil discharged from the main pump 14L is supplied to the A port of the turning hydraulic motor 21. In this case, the B port serves as the discharge side port, and the A port serves as the suction side port.

By providing the solenoid proportional valves 157a and 157b, the flow of the operating oil supplied to the turning hydraulic motor 21 is switched to a reverse direction irrespective of or irrelevant to the operation of the turning lever 26A by the operator. That is, by providing the solenoid proportional valves 157a and 157b, the operation of the turning hydraulic motor can be separated from the operation of the turning lever 26A by the operator. Accordingly, the pressure at the A port becomes a high-pressure, which permits a high braking force at the A port. Thereby, a large braking force is exerted in a reverse direction of the rotating direction of the rotation by inertia. Thus, the upper turning body 3 or the turning mechanism 2 can be caused to perform an avoiding operation even at a time when the controller 30 detects an entering object.

As mentioned above, if the controller 30 determines that an entering object enters the monitoring areas 18a, 18b and 18c, the operating oil is supplied from the main pump 14L to the turning hydraulic motor 21 irrespective of the operation of the turning lever 26A by the operator depending on the circumstances. That is, a large braking force is applied to the turning hydraulic motor 21 in a reverse direction of the turning direction.

Specifically, if it is determined by the controller 30 that an entering object enters the monitoring areas 18a, 18b and 18c, the controller switches the solenoid proportional valves 157a and 157b to cause the main pump 14L and either one of the ports of the turning hydraulic motor 21 to be set in the communicated state. More specifically, the controller 30 switches the solenoid proportional valves 157a and 157b so that the operating oil is supplied to the port opposite to the port to which the operating oil is being supplied due to the lever operation of the operator before the determination. Then, the controller 30 sets the pilot line 27R (or 27L) in the communicated state with the pilot line 37R (or 37L) to supply the secondary pressure from the pilot pump 15 to the R port or the L port of the flow control valve 157. The controller 30 switches the flow control valve 157 as mentioned above so as to set the discharge side port of the main pump 14L in the communicated state with either one of the ports of the turning hydraulic motor 21. That is, the high-pressure operating oil from the main pump 14L is supplied to the port (A port or B port) opposite to the port to which the operating oil is being supplied due to the lever operation of the operator. Thereby, the turning operation of the upper turning body 3 is controlled irrespective of the lever operation by the operator.

The detection signals of the entering object detection device 80 and the sensors 22A-22D are sent to the controller 30. Upon reception of the detection signals, the controller 30 outputs a control signal to the solenoid proportional valve.

According to the present embodiment, a braking distance can be shortened by applying a turning force (braking force) in an opposite direction to the turning direction of the upper turning body 3. This can avoid the shovel from being brought into contacting with an entering object.

Additionally, if the operator firmly grasps the turning lever 26A, the operation amount of the turning lever 26A may change due to a vibration of the shovel. In such a case, there may be a case where the turning operation of the upper turning body 3 does not stop and the turning operation is continued.

According to the present embodiment, a large braking force can be generated for the turning hydraulic motor even in such a case because the flow of the operating oil can be switched by switching the solenoid proportional valves 157a and 157b irrespective of or irrelevant to the changes in the operation amount of the lever.

Figure 7A:
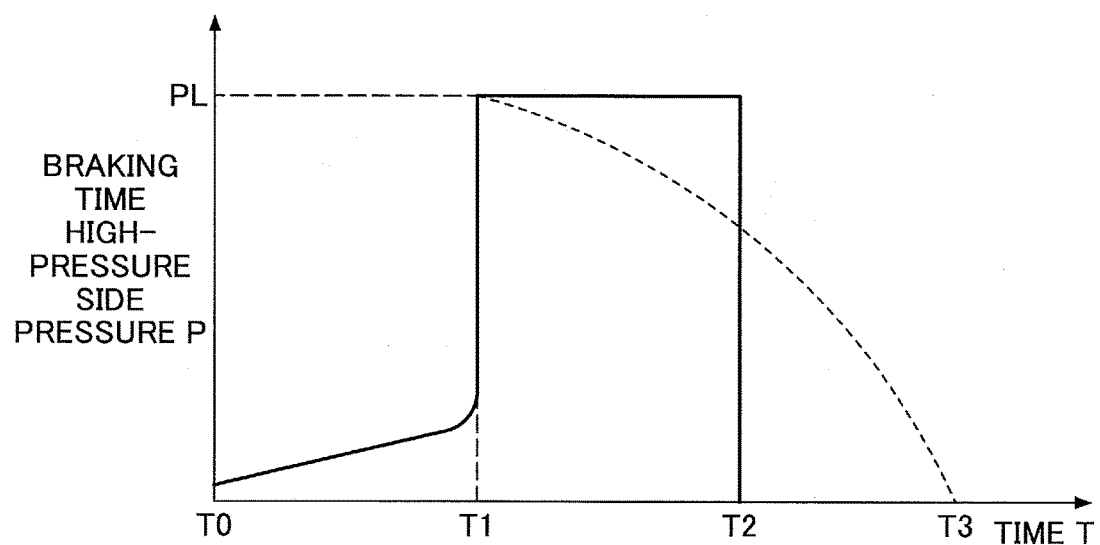
FIGS. 7A and 7B are graphs for explaining a control operation of the shovel provided with the hydraulic circuit illustrated in FIG. 6.
Figure 7B:
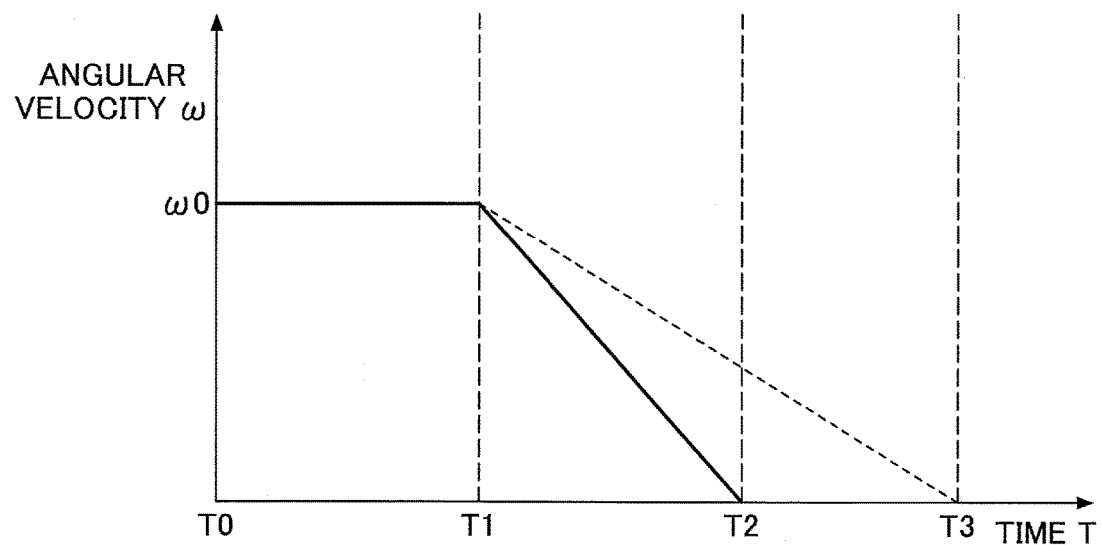

FIGS. 7A and 7B are graphs for explaining a control operation of the shovel mounted with the hydraulic circuit illustrated in FIG. 6. In FIGS. 7A and 7B, solid lines indicate a braking characteristic of a case where a deceleration or stop control of the turning operation of the upper turning body 3 of the shovel according to the present embodiment is performed. Dashed lines indicate, as a comparison example, a braking characteristic of a case where the above-mentioned control is not performed. The graph illustrated in FIG. 7A indicates a waveform of the pressure P at a braking time high-pressure side port of the turning hydraulic motor 21.

The graph illustrated in FIG. 7B illustrates a waveform of the angular velocity ω of the turning hydraulic motor 21. The graphs of FIGS. 7A and 7B have the same time axis.

First, a description is given of a case where a deceleration or stop control of the turning operation of the upper turning body 3 is performed, when the upper turning body 3 is performing a rightward turning operation, irrespective of or irrelevant to an operation of the turning lever 26A by the operator. A deceleration or stop control performed when the upper turning body 3 is performing a leftward turning operation is opposite to the control performed when the upper turning body 3 is performing a rightward turning operation, and a description thereof will be omitted.

When a rightward turning operation is performed, the pressure at the braking time high-pressure port of the turning hydraulic motor 21 changes as follows.

As indicated in FIG. 7A, in a period from time T0 to time T1, the turning hydraulic motor 21 is continuously turning at a fixed angular velocity ω0 according to a lever operation by the operator, and, thus, the upper turning body 3 is set in a constant velocity state. In this period, the operator tilted the turning lever 26A toward the right turning side to supply the operating oil from the pilot pump 15 to the R port of the flow control valve 157 to switch the flow control valve 157 to the right side position b. Thus, the high-pressure operating oil is supplied to the hydraulic line 322B (refer to FIG. 5), and the high-pressure operating oil flows to the B port of the turning hydraulic motor 21 and the low-pressure operating oil is discharged from the A port of the turning hydraulic motor 21. Accordingly, the turning hydraulic motor 21 rotates in the rightward direction.

If the controller 30 detects an entering object, the control signal is set in an ON state and the solenoid proportional valves 157a and 157b are switched. Specifically, the solenoid proportional valve 157a is switched to the right side position b and the solenoid proportional valve 157b is switched to the left side position c based on the control signal from the controller 30. Thereby, the operating oil in the pilot line 37R is released to the tank, and the operating oil from the pilot pump 15 is supplied to the pilot line 37L. Thus, the flow control valve 157 is switched from the right side position b to the left side position c, and the operating oil from the main pump 14L is supplied to the A port, which is at a low pressure (refer to FIG. 5). Accordingly, the pressure in the hydraulic line 322A (braking time high-pressure side pressure) sharply rises at time T1. When a large amount of the high-pressure operating oil is supplied to the hydraulic line 322A, the relief valve 324A is opened, and the pressure in the hydraulic line 322A reaches the relief pressure PL (relief maximum pressure). Because the operating oil is continuously supplied to the A port of the turning hydraulic motor 21, the pressure of the operating oil in the hydraulic line 322A is maintained at the relief pressure PL. As a result, after time T1, as indicated by the solid line in the graph of FIG. 7A, the pressure of the operating oil in the hydraulic line 322B is fixed at the relief pressure PL. By continuously supplying the operating oil to the A port of the turning hydraulic motor 21 by switching the flow of the operating oil in a reverse direction, a braking force to brake the turning hydraulic motor 21, which has performed the rightward turning operation, is generated. Because the operating oil is continuously supplied to the A port of the turning hydraulic motor 21, the braking force is maintained. Because the braking force is applied in a direction of preventing the rotation of the turning hydraulic motor 21, as indicated by the solid line in the graph of FIG. 7B, the angular velocity ω of the turning hydraulic motor 21 decreases after time T1.

As a result, as indicated by the solid line in the graph of FIG. 7B, the angular velocity ω of the turning hydraulic motor 21 decreases faster, and the upper turning body 3 stops at time T2.

After the upper turning body 3 is stopped, the solenoid proportional valve 157b is switched from the left side position c to the right side position b. The pilot line 37L is open to the tank and the flow control valve 157 is switched to the neutral position a.

Hereinafter the above-mentioned control according to the present embodiment is referred to as the "reverse lever control".

On the other hand, if the solenoid proportional valve 157a and 157b are not provided in the hydraulic circuit, and when the controller 30 detects an entering object at time T1, a braking is applied to the turning hydraulic motor 21 by stopping the supply of the operating oil by closing the flow control valve 157. Specifically, the supply of the operating oil to the hydraulic line 322B is stopped. Thereby, the hydraulic pressure at the B port of the turning hydraulic motor 21 decreases gradually. On the other hand, when the flow control 157 is closed, the flow of the operating oil is shut off, and, thereby, the operating oil is retained in the hydraulic line 322B, which causes the pressure of the operating oil at the A port to increase. If the pressure exceeds a predetermined pressure, the pressure of the operating oil at the A port reaches the relief pressure PL at time T1.

A braking force can be generated by the turning hydraulic motor 21 with the increase in the hydraulic pressure at A port. However, the turning hydraulic motor 21 cannot be decelerated or stopped instantaneously. That is, the turning hydraulic motor 21 continuously rotates due to an inertial force of the upper turning body 3, and the angular velocity ω of the turning hydraulic motor 21 decreases gradually as indicated by the dashed line in the graph of FIG. 7B. With the decrease in the angular velocity ω, an amount of operating oil discharged from the A port of the turning hydraulic motor 21 also decreases. Thus, the pressure of the operating oil in the hydraulic line 322A gradually decreases, which results in a gradual decrease in the braking force.

Accordingly, time T3 at which the angular velocity ω of the turning hydraulic motor 21 becomes zero is later than time T2 as illustrated in FIG. 7B. That is, the period spent on stopping the turning hydraulic motor 21 is longer than that of the present embodiment in which the braking force to the turning hydraulic motor 21 can be maintained.

Figure 8:
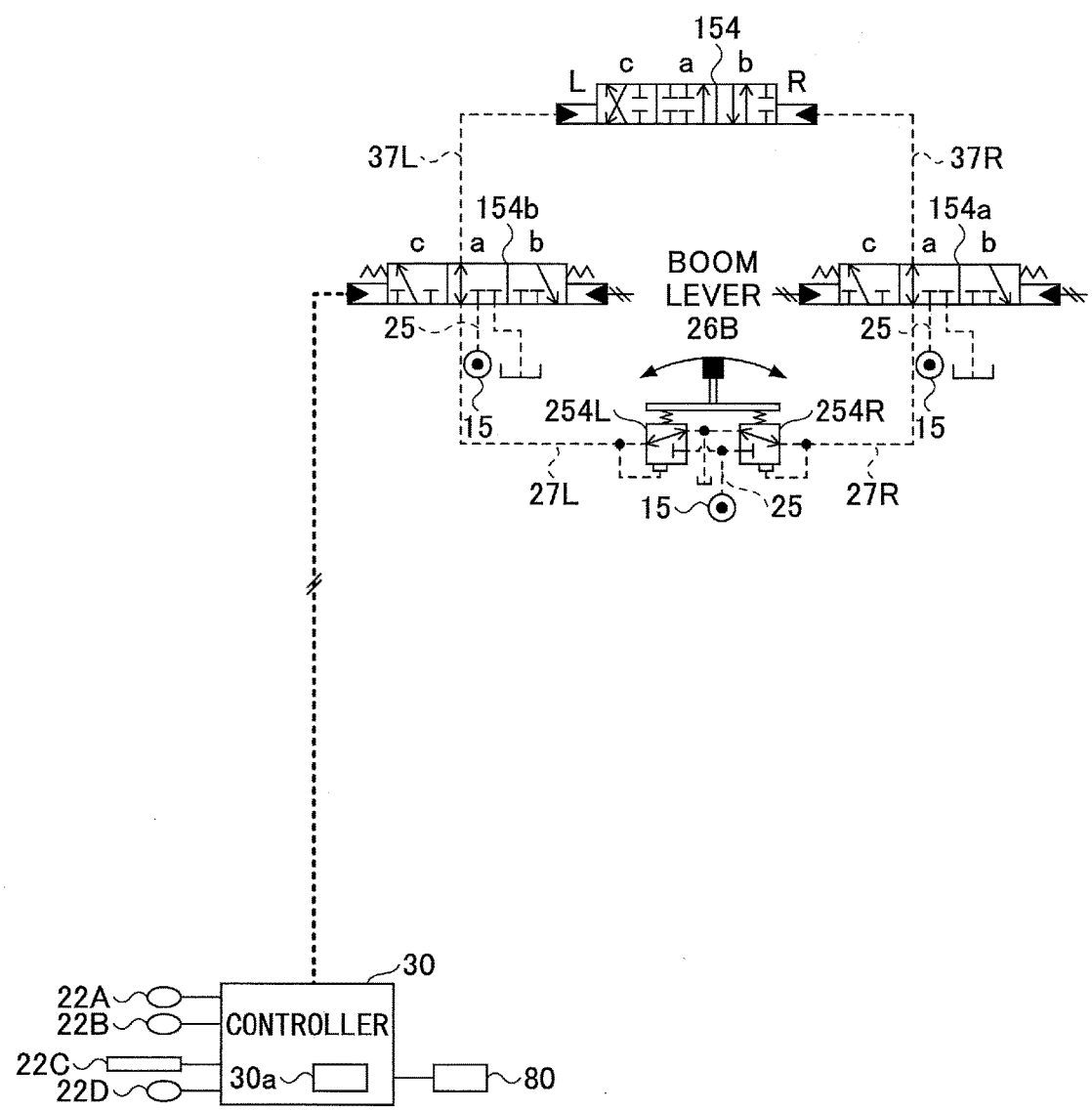
FIG. 8 is a hydraulic circuit diagram of the hydraulic system according to another embodiment.

FIG. 8 is a hydraulic circuit diagram of the hydraulic circuit according to another embodiment.

A description is given of the hydraulic circuit for controlling the drive of the boom cylinder 7. Similar to the operation of the turning lever 26A, the pilot pressure generated by the pilot pump 15 is supplied to the boom lever 26B through the pilot line 25. The boom lever 26B is operated by an operator. The boom lever 26B converts the primary side hydraulic pressure supplied from the pilot line 25 into a secondary side hydraulic pressure in response to the operation applied to the boom lever 26 by the operator. The secondary side hydraulic pressure is transmitted to solenoid proportional valves 154a and 154b (switching valves) through pilot lines 27R and 27L, and also transmitted to a flow control valve 154 through pilot lines 37R and 37L.

The operation device for operating the boom 4 is constituted by the boom lever 26B and remote control valves 254R and 254L.

The remote control valve 254R is a valve for outputting the pilot pressure, which corresponds to an amount of operation performed on the boom lever 26B in an upward direction or a downward direction, to the flow control valve 154. The solenoid proportional valves 154a and 154b are arranged between the boom lever 26B and the flow control valve 154.

Specifically, the remote control valves 254R and 254L are connected to the R port of the flow control valve 154 by the pilot lines 27R and 37R via the solenoid proportional valve 154a. The remote control valve 254L is connected to the L port of the flow control valve 154 by the pilot lines 27L and 37L via the solenoid proportional valve 154b. Each of the remote control valves 257R and 257L receives a pressure of the operating oil supplied by the pilot pump 15 as a primary pressure, and outputs a secondary pressure corresponding to an operation amount of the boom lever 26B as a pilot pressure.

The pilot pressure input to the flow control valve 154 is switched by the solenoid proportional valves 154a and 154b.

Specifically, the solenoid proportional valve 154a is a 4-port 3-position valve. A first port of the solenoid proportional valve 154a is connected to the R port of the flow control valve 154 through the pilot line 37R. A second port of the solenoid proportional valve 154a is connected to the remote control valve 254R through the pilot line 27R. A third port of the solenoid proportional valve 154a is connected to the pilot pump 15 through the pilot line 25. A fourth port of the solenoid proportional valve 154a is connected to the tank.

Similar to the solenoid proportional valve 154a, the solenoid proportional valve 154b is also a 4-port 3-position valve. The connection relationship of first port through fourth port is basically the same as the connection relationship of the solenoid proportional valve 154a, and a description thereof will be omitted.

In a hydraulic circuit which is not provided with the solenoid proportional valves 154a and 154b to the pilot lines 27R and 27L, respectively, the flow control valve 154 is switched to the neutral position a so as to avoid a contact between the shovel and an entering object. Thereby, the center bypass pipe path 40R and the hydraulic lines 322A and 322B are set in the non-communicated state to stop the supply of the operating oil to the turning hydraulic motor 21. However, according to this method, a time period from the deceleration of the upper turning body 3 to the stop of the upper turning body 3 becomes long.

Thus, according to the present embodiment, the solenoid proportional valves 154a and 154b are provided to shorten the time period from the deceleration to the stop of the upper turning body 3. In order to do that, the flow of the operating oil from the main pump 14R is automatically switched by switching the flow control valve 154. Thereby, the boom lever 26B is operated in a downward direction and the attachment 125 is brought into contact with a ground. Because a larger braking force is applied to the turning hydraulic motor, the turning operation of the upper turning body 3 can be stopped more quickly.

Specifically, the secondary pressure of the operating oil discharged from the pilot pump 15 is supplied to the R port of the flow control valve 154 (refer to FIG. 5). If the controller 30 detects an entering object while the upper turning body 3 is turning, the controller 30 switches the solenoid proportional valve 154a based on the control signal of the controller 30. More specifically, the controller 30 switches the solenoid proportional valve 154*a* from the neutral position a to the left side position c. At this time, the solenoid proportional valve 154*b* may be maintained at the neutral position a. Thereby, the pilot line 25 is set in the communicated stated with the pilot line 37R, and the pilot line L is set in the communicated state with the pilot line 37R. By switching the solenoid proportional valve 154*a* from the neutral position to the left side position c, the secondary pressure of the operating oil discharged from the pilot pump 15 is supplied to the R port of the flow control valve 154. Thereby, the center bypass pipe path 40R and the hydraulic line 44B are set in the communicated state with each other, and the discharge side port of the main pump 14R is set in the communicated state with the rod side port of the boom cylinder 7. If the boom lever 26B is not operated by the operator, the L port of the flow control valve 154 is at a low pressure.

Accordingly, a pressure difference is generated between the R port and L port of the flow control valve 154 and the flow control valve 154 is switched to the right side position a. Thus, even if the operator is not operating the boom lever 26B, the downward operation of the boom 4 is automatically performed.

If the boom lever 26B is operated in the upward direction by the operator, the solenoid proportional valve 154*a* is switched from the neutral position a to the left side position c, and the solenoid proportional valve 154*b* is switched from the neutral position a to the right side position b. That is, the pilot line 25 is set in the communicated state with the pilot line 37R, and the pilot line 37L is set in the communicated state with the tank port. Thereby, even if the operator is operating the boom lever 26B in the upward direction, the downward operation of the boom 4 is performed automatically. That is, by providing the solenoid proportional valves 154*a* and 154*b*, the operation of the boom 4 can be separated from the operation of the boom lever 26B by the operator.

By bringing the attachment 125 into contact with the ground by performing downward operation of the boom 4, a larger braking force can be generated in the upper turning body 3. This is effective in a case where the shovel is closer to the entering object.

By providing the solenoid proportional valves 154*a* and 154*b*, the flow of the operating oil from the main pump 14R can be switched to the boom down direction irrespective of or irrelevant to the operation of the boom lever 26B by the operator. By bringing the attachment 125 into contact with the ground, a large braking force is applied to the turning hydraulic motor 21, which is rotating due to inertia, in a direction opposite to the rotating direction of the turning hydraulic motor 21. Thus, even if the upper turning body 3 is turning at a high speed and the upper turning body 3 is approaching the entering object at a high speed, the attachment 125 can be reliably avoided from contacting with the entering object.

According to the present embodiment, the braking distance can be shortened by generating a frictional force by the contact between the attachment 125 and the ground in a direction opposite to the turning direction of the upper turning body 3. Thus, the shovel is avoided from contacting with the entering object.

Moreover, if the operator firmly holds the turning lever 26A, the operation amount of the turning lever 26A may change due to a vibration of the shovel. In such a case, there may be a case where the turning operation of the upper turning body 3 does not stop and the turning operation is continued.

As mentioned above, if it is determined by the controller 30 that an entering object enters the monitoring areas 18*a*, 18*b* and 18*c*, the operation oil is supplied from the main pump 14R to the boom cylinder 7. Then, the solenoid proportional valves 154*a* and 154*b* are switched to set the main pump 14R and the rod side port of the boom cylinder 7 in the communicated state with each other. Thereby, the grounding of the attachment 125 is performed, and a large braking force is applied to the turning hydraulic motor 21 in the opposite direction to the rotating direction of the turning hydraulic motor 21.

Specifically, the solenoid proportional valves 154*a* and 154*b* are switched so as to cause the attachment 125 to be grounded to stop the upper turning body 3. Then, the pilot line 25 is set in the communicated state with the pilot line 37R to supply the secondary pressure from the pilot pump 15 to the R port of the flow control valve 154. Thereby, the low control valve 154 is switched, and a hydraulic line 44B connected to the rod side of the boom cylinder 7 is set in the communicated state with the center bypass pipe path 40R. That is, the discharge side port of the main pump 14R is set in the communicated state with the rod side port of the boom cylinder 7. As a result, if it is determined by the controller 30 that an entering object enters the monitoring areas 18*a*, 18*b* and 18*c*, the attachment 125 is moved downward and the grounding control is performed irrespective of the operation of the boom lever 26B by the operator depending on the circumstances.

According to the present embodiment, a large braking force can be generated to the turning hydraulic motor 21 because the flow of the operating oil can be switched by switching the solenoid proportional valves 154*a* and 154*b* irrespective of changes in the lever operation amount.

According to the hydraulic circuit of the present embodiment, a control to move the attachment 125 upward can be performed by setting the hydraulic line 44A connected to the head side of the boom cylinder 7 in the communicated state with the center bypass pipe path 40R. Such a control is described later.

Figure 9:
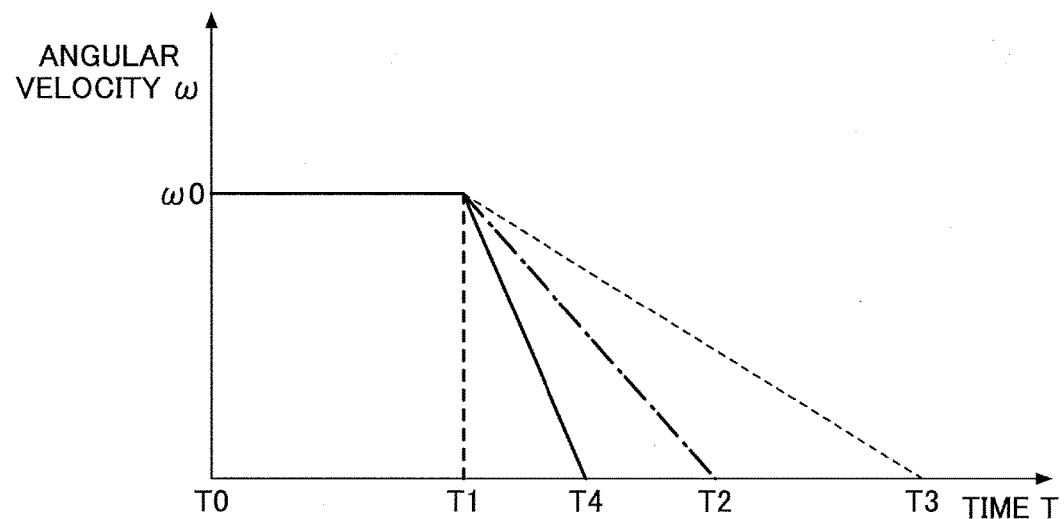
FIG. 9 is a graph for explaining a control operation of the shovel provided with the hydraulic circuit illustrated in FIG. 8.

FIG. 9 is a graph for explaining the control operation of the shovel mounted with the hydraulic circuit illustrated in FIG. 8. In FIG. 9, a solid line indicates a braking characteristic in a case where a control according to the present embodiment to avoid the attachment 125 from contacting with an entering object is performed. A single-dashed chain line indicates a braking characteristic, as a comparison example, in a case where the reverse lever control is performed as a comparison example. A dashed line indicates a breaking characteristic, as a comparison example, in a case where the above-mentioned controls are not performed. In FIG. 9, the horizontal axis represents time T, and the vertical axis represents the angular velocity ω of the turning hydraulic motor 21.

As indicated in FIG. 9, in a period from time T0 to time T1, the turning hydraulic motor 21 is continuously turning at a fixed angular velocity ω0 according to a lever operation by the operator, and, thus, the upper turning body 3 is set in a constant velocity state.

If the controller 30 detects an entering object at time T1, the control signal is set in an ON state. Specifically, the solenoid proportional valve 154*a* is switched to the left side position c based on the control signal from the controller 30. Thereby, the flow control valve 154 is switched to the right side position b, and the operating oil from the main pump 14R is supplied to the rode side of the boom cylinder 7. Thus, the downward operation of the boom 4 is stared, and the attachment 125 including the boom 4 is grounded.

According to the grounding operation, a frictional force is generated between the attachment 125 and the ground, which the frictional force turns into a braking force to stop the upper turning body 3 from turning. By generating the braking force, as indicated by the solid line in the graph of FIG. 9, the angular velocity ω of the turning hydraulic motor 21 decreases after time T1. Because a large frictional force is generated by grounding the attachment 125 by performing the downward operation of the boom 4, the angular velocity ω of the turning hydraulic motor 21 decreases faster than the others as indicated by the solid line in the graph of FIG. 9, and the upper turning body 3 stops at time T4, which is earlier than time T2 and time T3. Even if the turning lever 26A is set at a neutral position by the operator so as to shut off the supply of the operating oil from the main pump 14L to generate a braking force, the above-mentioned grounding control of the attachment 125 is performed in a case it is difficult to avoid the attachment 125 from contacting with the entering object.

If the above-mentioned function according to the present embodiment is not provided, that is, if the solenoid proportional valves 154a and 154b are not provided between the boom lever 26 and the flow control valve 154, there may be a case where a braking is too late depending on the turning speed of the upper turning body 3. That is, the time at which the angular velocity ω of the turning hydraulic motor 21 becomes zero is as late as time T3 (refer to the dashed line in the graph of FIG. 9). However, according to the present embodiment in which a large breaking force is generated, the time at which the angular velocity ω of the turning hydraulic motor 21 becomes zero is as early as time T4 (refer to the solid line in the graph of FIG. 9).

Further, the braking force, which is generated by grounding the attachment 125 at a high speed by performing the downward operation of the boom 4, is larger than the braking force generated in the embodiment illustrated in FIG. 5 in which the flow of the operating oil in the turning hydraulic motor 21 is switched to generate a braking force in an opposite direction to the turning direction. Thus, the time at which the angular velocity ω of the turning hydraulic motor 21 becomes zero is as early as time T4 (refer to the solid line in the graph of FIG. 9) as compared to the embodiment illustrated in FIG. 5 (refer to the dashed line extending to time T3 in the graph of FIG. 9).

Figure 10:
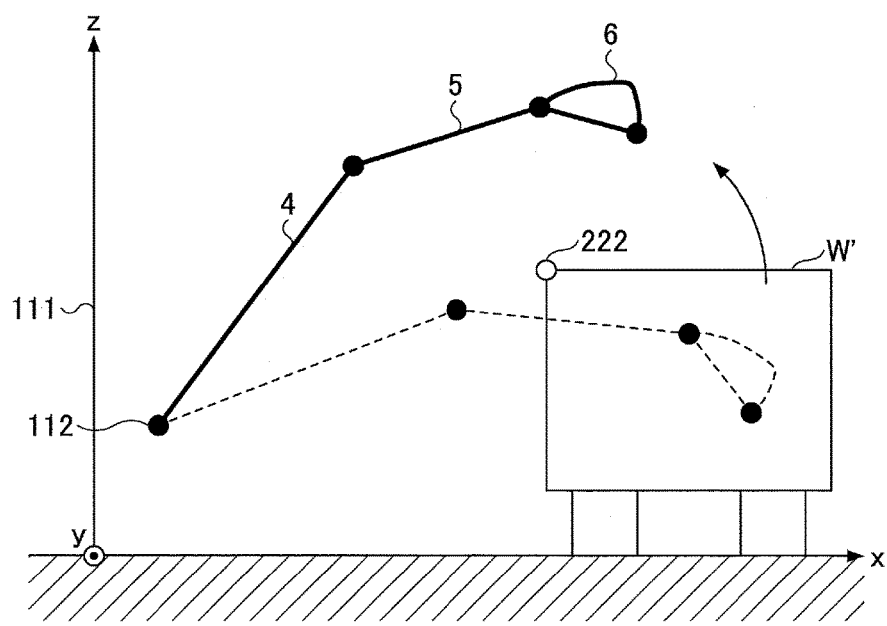
FIG. 10 is an illustration for explaining a control operation of the shovel according to a further embodiment.

FIG. 10 is an illustration for explaining the control operation of turning the upper turning body 3 of the shovel according to a further embodiment.

Unlike the embodiment illustrated in FIG. 9, in the hydraulic circuit illustrated in FIG. 8, the secondary pressure of the operating oil discharged from the pilot pump 15 is supplied to the L port side of the flow control valve 154. If the controller 30 detects an entry of the entering object, the solenoid proportional valve 154b is switched based on the control signal of the controller 30 (refer to FIG. 8). More specifically, the solenoid proportional valve 154b is switched from the neutral position a to the left side position c. Then, the pilot line 25 is set in the communicated state with the pilot line 37L to supply the secondary pressure from the pilot pump 15 to the L port of the flow control valve 154. Thereby, the flow control valve 154 is switched, and the hydraulic line 44A, which is connected to the head side of the boom cylinder 7, is set in the communicated state with the center bypass pipe path 40R. That is, the discharge side port of the main pump 14R is set in the communicated state with the head side of the boom cylinder 7. As a result, the attachment 125 is lifted irrespective of the lever operation by the operator. The solenoid proportional valve 154a may be at the neutral position a. By switching the solenoid proportional valve 154b from the neutral position a to the left side position c, the pilot line 25 is set in the communicated state with the pilot line 37L and the pilot line 27R is set in the communicated state with the pilot line 37R. Thus, the secondary pressure of the operating oil discharged from the pilot pump 15 is supplied to the L port of the flow control valve 154. When the boom lever 26B is not operated by the operator, the R port of the flow control valve 154 is at a low pressure.

Thus, a pressure difference is generated between the R port and the L port of the flow control valve 154, and the flow control valve 154 is switched to the left side position c. Thereby, even when the operator is not operating the boom lever 26B, the lifting operation of the boom 4 is performed automatically.

When the boom lever 26B is operated in the downward direction by the operator, the solenoid proportional valve 154a is switched from the neutral position a to the right side position b and the solenoid proportional valve 154b is switched from the neutral position a to the left side position c. That is, the pilot line 25 is set in the communicated state with the pilot line 37L and the pilot line 37R is set in the communicated state with the tank port. Thereby, even when the operator is operating the boom lever 26B in the downward direction, the lifting operation of the boom 4 is performed automatically. As a result, if it is determined by the controller 30 that an entering object enters the monitoring areas 18a, 18b and 18c, the avoiding control is performed by lifting the attachment 125 irrespective of or irrelevant to the operation of the boom lever 26B by the operator according to the circumstances.

More specifically, the lifting operation of the boom 4 is performed by switching the flow control valve to the left side position, which causes the operating oil from the main pump 14R to flow to the head side of the boom cylinder 7 and causes the operating oil from the rod side to the operating oil tank.

When the controller 30 detects the entering object, the control signal is turned to an ON state. Specifically, the solenoid proportional valves 154a and 154b are switched based on the control signal from the controller 30. Thereby, the discharge side port of the main pump 14R is set in the communicated state with the head side of the boom cylinder 7 to supply the operating oil from the main pump 14R to the boom cylinder 7. As a result, the operating oil from the rod side of the boom cylinder 7 is ejected to the operating oil tank, which causes the lifting operation of the boom 4.

By performing the lifting operation of the boom 4, as illustrated in FIG. 10, the attachment including the boom 4 is moved in the upward direction. By raising the attachment 125 from a low position (refer to the dashed line in FIG. 10) to a high position (refer to the solid line in FIG. 10), the attachment 125 is avoided from contacting with the entering object.

By providing the solenoid proportional valves 154a and 154b, the lifting operation of the boom 4 is performed automatically according to the control signal from the controller 30. Thus, the operation of the attachment 125 including the boom 4 can be switched to the upward movement irrespective of the operation of the boom lever 26B by the operator. That is, by providing the solenoid proportional valves 154a and 154b, the operation of the boom 4 is separated from the operation of the boom lever 26B by the operator.

Accordingly, even if the braking operation is not performed in time when the operator returns the turning lever 26A to the neutral position or performs a reverse lever control, the shovel is reliably avoided from contacting with the entering object by performing the control operation to move the attachment 125 in the upward direction.

Moreover, if the operator is holding the turning lever 26A or the boom lever 26B, there may be a case where operation amount of the lever changes due to a vibration of the shovel body. In such a case, the turning operation of the upper turning body 3 and the lifting or downward operation of the boom 4 may not be performed as intended by the operator.

However, according to the present embodiment, the attachment 125 can be avoided from contacting with the entering object automatically by switching the solenoid proportional valves 154a and 154b irrespective of the change in the operation amount of the lever.

As mentioned above, if it is determined by the controller 30 that an entering object enters the monitoring areas 18a, 18b and 18c, the operating oil is supplied from the main pump 14R to the boom cylinder 17. Then, the main pump 14R is set in the communicated state with the head side port of the boom cylinder 7 by switching the solenoid proportional valves 154a and 154b. Thereby, the lifting operation of the attachment 125 is performed, which permits the attachment 125 to avoid from contacting with the entering object.

In the following explanation, the above-mentioned control operation is referred to as the "avoid control".

As mentioned above, if it is determined by the controller 30 that an entering object enters the monitoring areas 18a, 18b and 18c, the solenoid proportional valves 154a and 154b are set in the communicated state so that the grounding control of the attachment 125 or the avoid control of the attachment 125 is performed. That is, the discharge side port of the pilot pump 15 is set in the communicated state with any one of the ports of the flow control valve 154. Thereby, the switching operation of the flow control valve 154 is performed.

Figure 11:
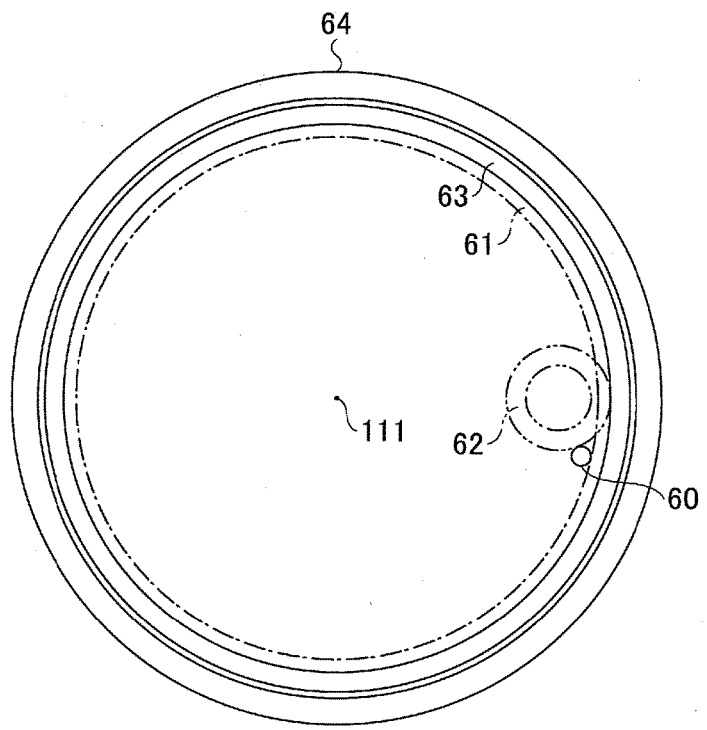
FIG. 11 is a an illustration for explaining a turning mechanism for turning the upper turning body.

FIG. 11 is an illustration for explaining a turning mechanism of the shovel according to an embodiment different from that of FIG. 7.

A description is given, with reference to FIG. 11, of a shovel control mechanism according to an embodiment different from the above-mentioned embodiments.

As illustrated in FIG. 11, the turning operation of the upper turning body 3 in the shovel according to the present embodiment is achieved by causing an inner tooth gear 61, which is fixed to the lower running body 1, to be engaged with a turning pinion 62, which is incorporated in the upper turning body 3.

Specifically, an inner race 63 is driven by the turning pinion 62 via the inner tooth gear 61 at a low speed and high-torque. Thereby, a turning frame 3a is rotated together with an outer race about the turning center 11, which causes the upper turning body 3 to perform the turning operation. The inner race 63 and an outer race 64 are arranged to make concentric circles with respect to the turning center 111 of the upper turning body 3. More specifically, the turning pinion 62 is engaged with the inner tooth gear 61 formed on the inner periphery of the inner race 63, and the inner tooth gear 61 is fixed to the turning frame 3a. The upper turning body 3 performs a turning operation by the turning pinion 62 moving along the inner periphery of the inner race 63.

By inserting a pin 60 into the inner tooth gear 61 while the upper turning body 3 is turning, the motion of the inner race 63 is stopped to forcibly stop (lock) the upper turning body 3. Thereby, the upper turning body 3 is stopped urgently, which permits reliable avoiding of the shovel from contacting with the entering object even if there is a high-possibility of contact with the entering object. In the following explanation, the above-mentioned control operation is referred to as the "pin insertion control".

Figure 12:
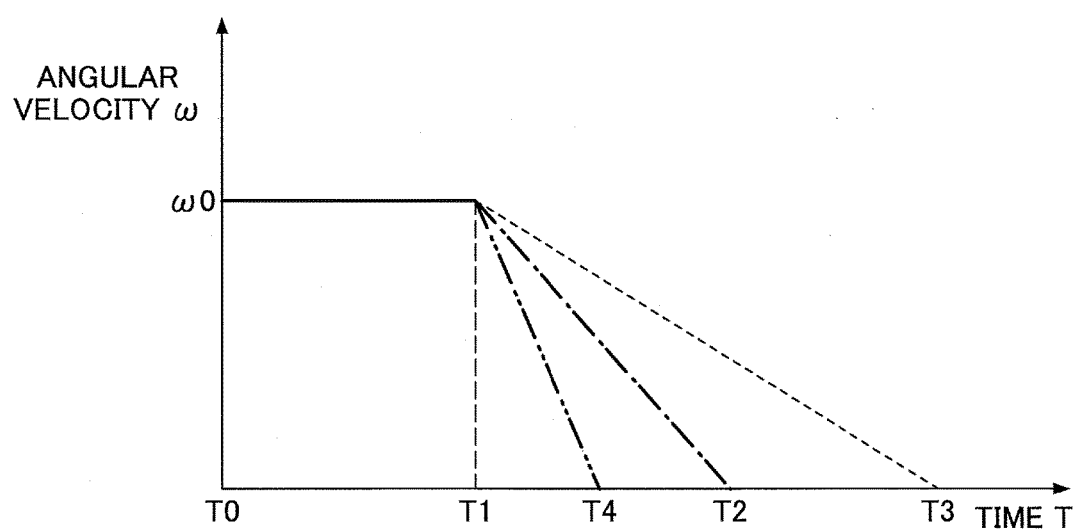
FIG. 12 is a graph for explaining a control operation of the shovel equipped with the turning mechanism illustrated in FIG. 11.

FIG. 12 is a graph for explaining a control operation of the shovel equipped with the turning mechanism illustrated in FIG. 11. In FIG. 12, a solid line indicates a braking characteristic of the pin insertion control in the shovel according to the present embodiment. A single-dashed chain line indicates, as a comparison example, a braking characteristic, when the reverse lever control is performed. A double-dashed chain line indicates, as a comparison example, a braking characteristic when the grounding control of the attachment is performed. A dashed line indicates, as a comparison example, a braking characteristic, when the above-mentioned control is not performed. The vertical axis represents time T, and the horizontal axis represents the angular velocity ω of the turning hydraulic motor 21.

In the period from time T0 to time T1, the upper turning body 3 continuously turns at a constant angular velocity ω0, and the upper turning body 3 is in a constant speed state.

At time T1, when the controller 30 detects an entering object, the control signal is turned to an ON state. Specifically, the pin 60 is inserted into the inner tooth gear 61 base on the control signal from the controller 30. Because the turning pinion 62 is locked by the pin 60 being inserted into the inner tooth gear 61, the drive of the inner race 63 is stopped, and, thereby, the upper turning body 3 is stopped. As a result, if it is determined by the controller 30 that an entering object enters the monitoring areas 18a, 18b and 18c, the pin insertion control is performed irrespective of the operation of the boom lever 26B by the operator according to the circumstances. According to the present embodiment, the upper turning body 3 is stopped simultaneously with the control signal being turned to the ON state.

Accordingly, the upper turning body 3 is stopped much faster than the case where the turning lever 26A is returned to the neutral position so as to cause the turning hydraulic motor 21 to generate a braking force (refer to the dashed line in the figure).

Moreover, unlike other embodiments (the reverse lever control, grounding control of the attachment 125, and avoid control of the attachment 125 attachment), there is no need to spend a predetermined time from the output of the control signal by the controller 30 to time (T2, T3 and T4), and the upper turning body 3 can be urgently stopped.

Figure 13:
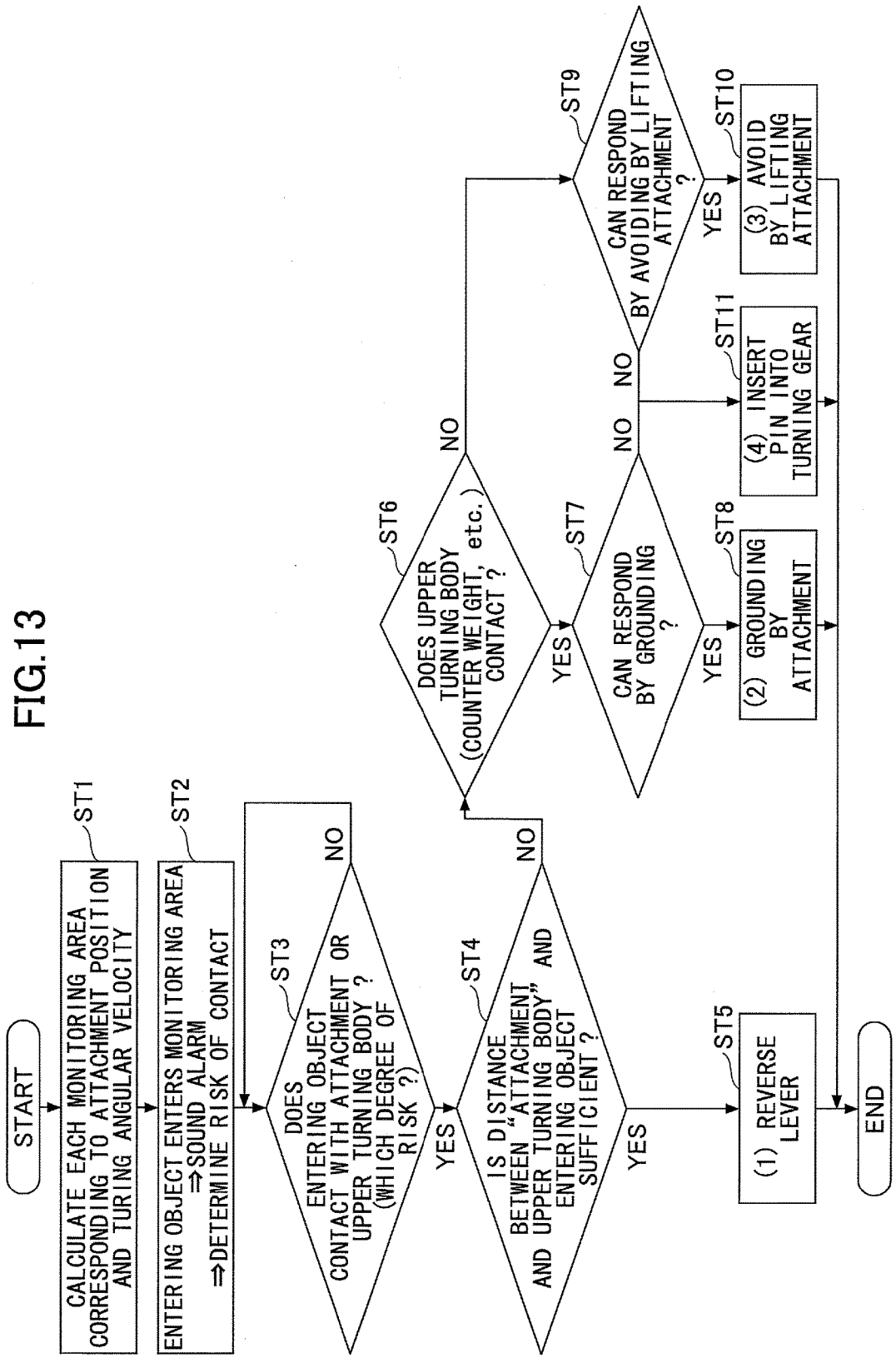
FIG. 13 is a flowchart of a control process of the shovel.

A description is given, with reference to FIG. 13, of a control process of the upper turning body 3 or the attachment 125 by the controller 30. FIG. 13 is a flowchart of a control process performed by the shovel according to the present embodiment.

As illustrated in FIG. 13, first, the first monitoring area 18a, second monitoring area 18b and third monitoring area 18c are determined based on the position of the attachment 125 and the angular velocities ω, ω', ω" of the upper turning body 3 in a controlling part 30a of the controller 30 (step ST1). Further, the controller computes the height from the swing center 112 to the tip of the bucket 6, the attachment length R, and the radiuses R and R" based on the results of measurement input from the angle sensors 22A and 22B and the stroke sensor 22C.

When the attachment length R is fixed, it is desirous to set the monitoring angle upper limit value αd (refer to FIG. 3) is set larger as the angular velocity ω becomes larger. Moreover, if the angular velocity ω is constant, it is desirous to set the monitoring angle upper limit αd larger as the attachment length R becomes longer. This is because the moment of inertia acted on the shovel becomes large.

The radius R' of the second monitoring area 18b is fixed. It is desirous to set the monitoring angle upper limit value αd (refer to FIG. 3) larger as the angular velocity ω' becomes larger. Similarly, because the radius R" of the third monitoring area 18c is fixed, it is desirous to set the monitoring angle upper limit value αd larger as the angular velocity ω" becomes larger.

According to the above-mentioned results of calculation, the sizes of the monitoring areas 18a, 18b and 18c are determined.

Then, the type of the entering object is identified by analyzing image data input from the entering object detection device 80. The identification is performed by changing the light-emitting color of the transmitter 222 attached to the entering object in response to the type of the entering object. The deter mining part 30a of the controller 30 (refer to FIG. 6) determines the control operation of the upper turning body 3 or the attachment 125 based on the thus-calculated monitoring areas 18a, 18b and 18c and the type and positional relationship of the entering object.

Specifically, the controller determines whether a possibility of contact (abutment) of the entering object with the shovel is high so as to determine the control operation of the upper turning body 3 or the attachment 125 to be used.

The controller determines which one of the monitoring areas the entering object enters. This determination is performed by the determining part 30a of the controller 30 based on the image data of the entering object detection device 80. When an entering object enters one of the monitoring areas, for example, an alarm lamp is turned on or blinked, and sound an alarm buzzer (step ST2). At this time, the type of alarming may be changed for each emergency area. Further, the determining part 30a determines a degree of risk (degree of emergency) of the entering object being contacted with a drive part including the upper turning body 3 and the attachment 125 (step ST3). According to the degree of risk, the controller 30 determines the avoid control to avoid the drive part from contacting with the entering object.

If it is possible that the entering object, which enters the first monitoring area 18a, comes into contact with the first attachment 125 or the upper turning body 3 (YES in step ST3), the determining 30a determines a distance between the entering object and the attachment 125 or the upper turning body. 3.

Specifically, the determining part 30a determines whether a distance between the attachment 125 and the entering object and a distance between the upper turning body 3 and the entering object are larger than a predetermined distance. If it is determined in step ST 4 that each distance is larger than the predetermined distance (YES in step ST4), the controller 30 performs the "reverse lever control" (step ST5). The stop operation of the upper turning body 3 is performed by reversing the flow of the operating oil circulating through the turning hydraulic motor 21.

If it is determined in step ST4 that either one of the distances is not larger than the predetermined distance (NO in step ST4), it is determined whether a distance between the counter weight of the upper turning body 3 and the entering object is longer than the predetermined distance (step ST6). That is, it is determine in step ST6 whether the upper turning body 3 or the attachment 125 can avoid from contacting with the entering object by performing the above-mentioned other control operations when there is no room in the distance to cope with the "reverse lever control".

If it is determined in step ST6 that the distance is longer than the predetermined distance (NO in step ST6), it is determined whether the contact can be avoided by lifting the attachment 125 (step ST9). If it is determined in step ST9 that the contact can be avoided by lifting the attachment 125 (Yes in step ST9), the "avoid control of the attachment 125" is performed (step ST10).

On the other hand, if it is determined in step ST6 that the distance is not longer than the predetermined distance (YES in step ST6), it is determined whether the contact can be avoided by grounding the attachment 125 (step ST7). If it is determined in step ST7 that the contact can be avoided by the grounding (YES in step ST7), the grounding control of the attachment 125" is performed (step ST8).

If it is determined that it is difficult to avoid the contact by either one of the "avoid control of the attachment 125" and the "grounding control of the attachment 125" (NO in steps ST7 and ST9), the "pin insertion control" is performed to forcibly stop the turning operation of the upper turning body 3 (step ST11).

Figure 14:
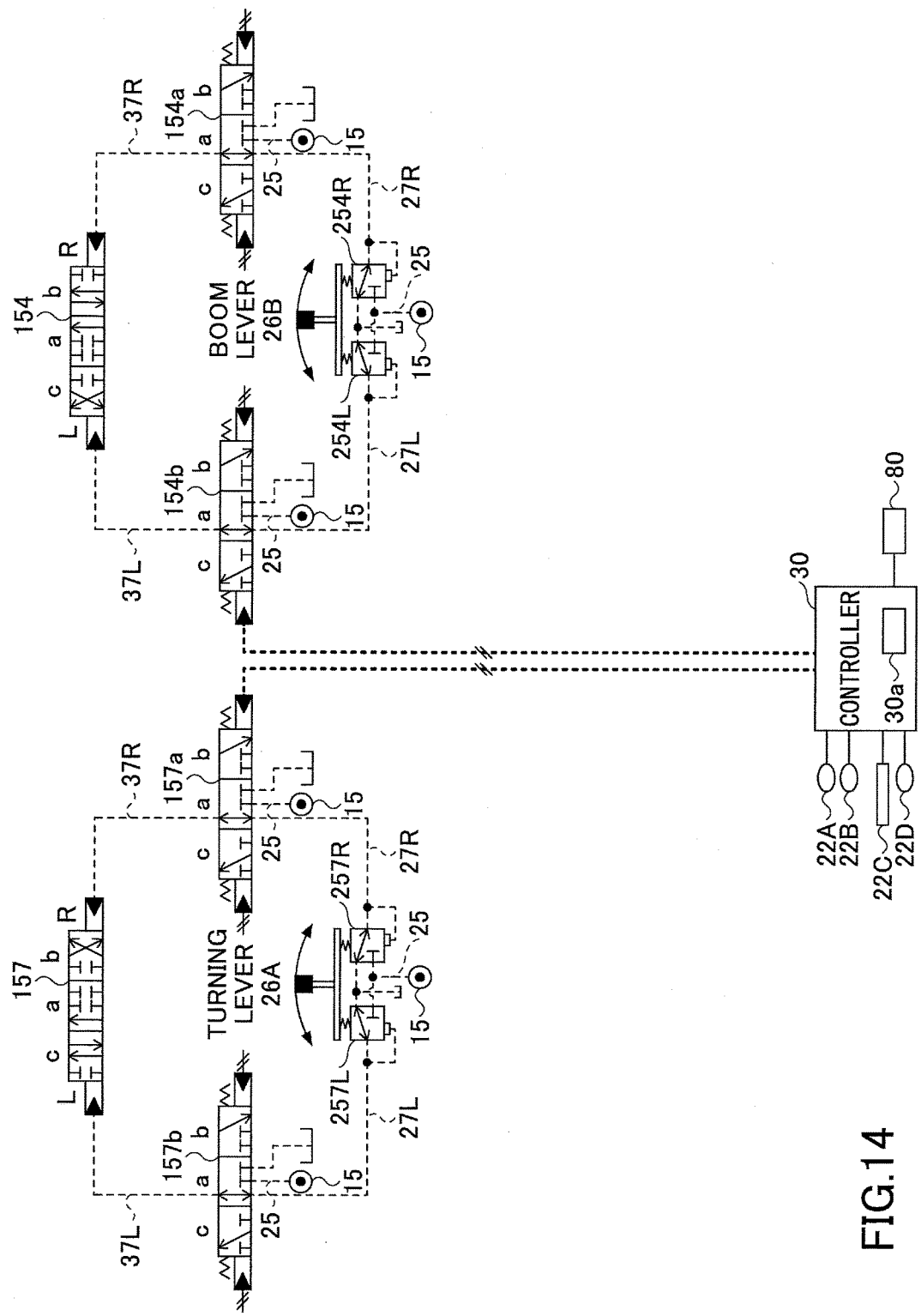
FIG. 14 is a hydraulic circuit diagram of a hydraulic circuit between the operation lever and the flow control valve according to another embodiment.

In the above-mentioned embodiments, the hydraulic circuits of the turning lever and the boom lever is illustrated and explained individually as a hydraulic circuit for performing switching of the flow control valve by solenoid proportional valves. However, the present invention is not limited to such as structure. For example, as illustrated in FIG. 14, both the flow control valves of the hydraulic circuits of the turning lever and the boom lever may be switched by the respective solenoid proportional valves.

Figure 15:
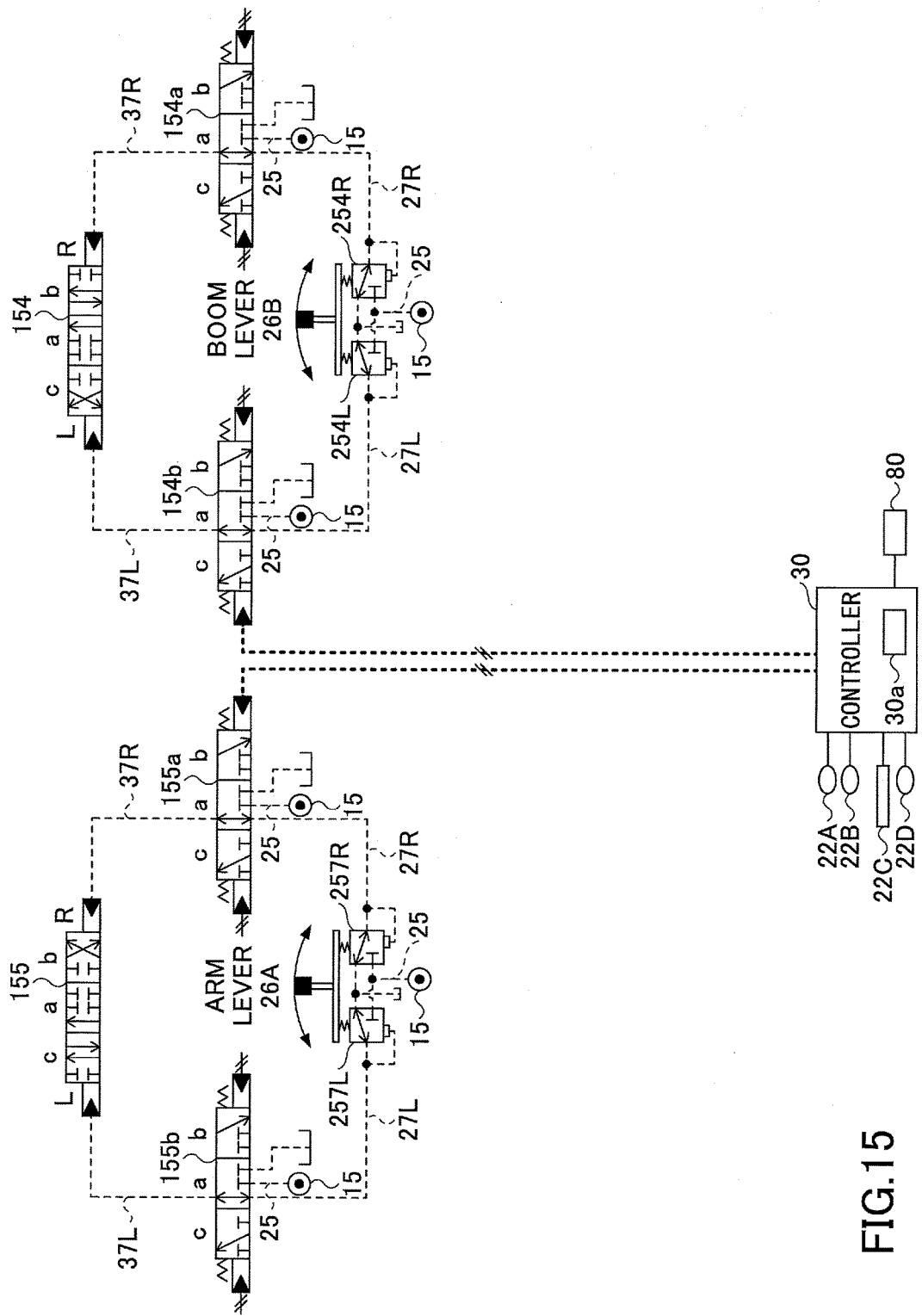
FIG. 15 is a hydraulic circuit diagram of a hydraulic circuit between the operation lever and the flow control valve according to a further embodiment.

Alternatively, as illustrated in FIG. 15, both the flow control valves of the hydraulic circuits of the boom lever and the arm lever may be switched by the respective solenoid proportional valves.

Figure 16:
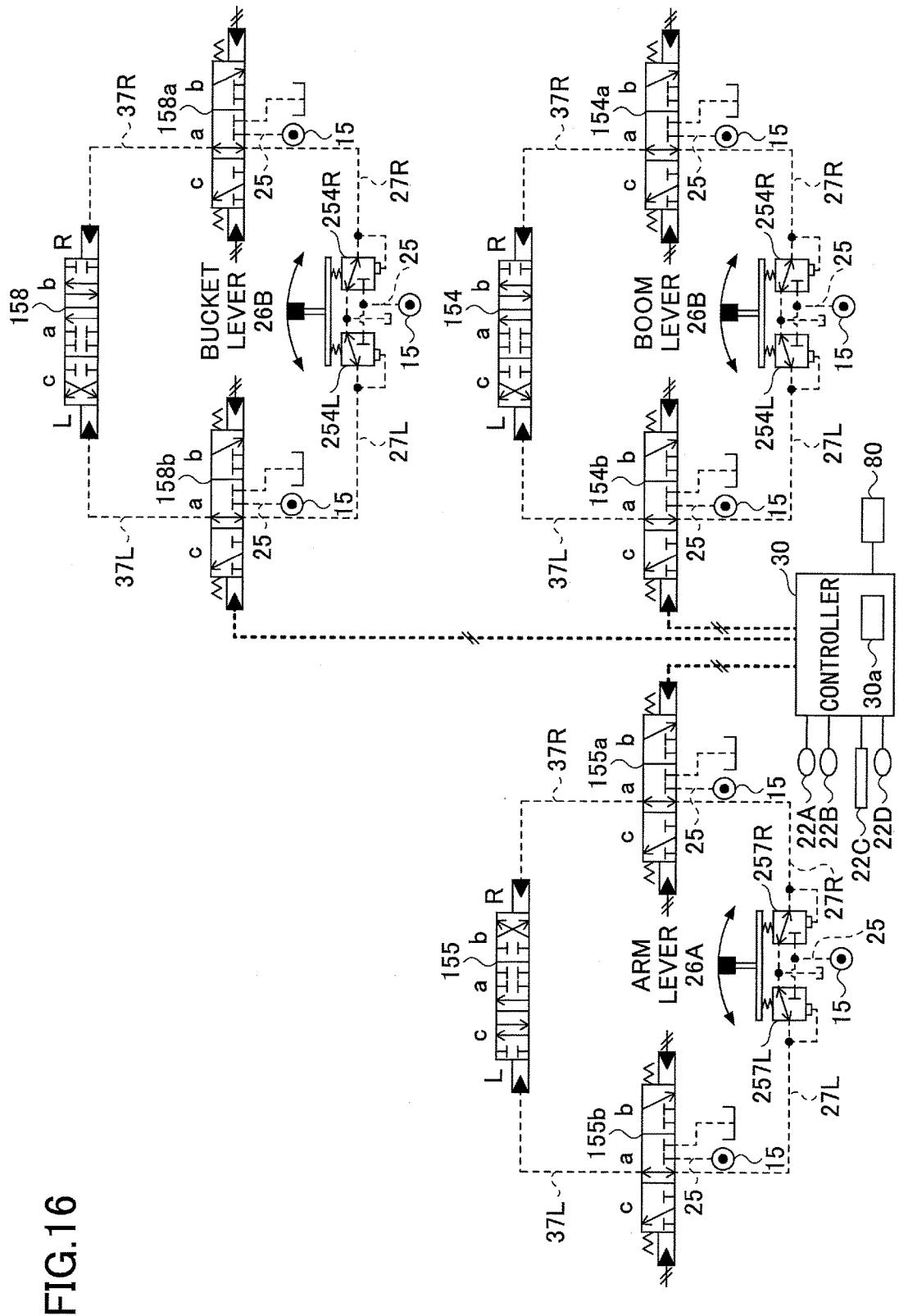
FIG. 16 is a hydraulic circuit diagram of a hydraulic circuit between the operation lever and the flow control valve according to yet another embodiment.

Alternatively, as illustrated in FIG. 16, all of the flow control valves of the hydraulic circuits of the boom lever, the arm lever and the bucket lever may be switched by the respective solenoid proportional valves.

The hydraulic circuit of the arm lever causes the operating oil to be supplied to the R port of the flow control valve 155 by switching the solenoid valve 155a to the left side position c by the controller 30. Thereby, the flow control valve 155 is switched to the right side position b, which causes the operating oil to be supplied from the main pump 14L to the head side of the arm cylinder 8 (refer to FIG. 5). Thereby, the lifting operation of the arm 5 is automatically (forcibly) performed. When performing the downward operation of the arm 5 automatically, the flow control valve 155 is switched to the left side position c by switching the solenoid proportional valve 155b to the left side position c by the controller 30.

The hydraulic circuit of the bucket lever causes the operating oil to be supplied to the R port of the flow control valve 158 by switching the solenoid valve 158a to the left side position c by the controller 30. Thereby, the flow control valve 158 is switched to the right side position b, which causes the operating oil to be supplied from the main pump 14R to the head side of the bucket cylinder 9 (refer to FIG. 5). Thereby, the opening operation of the bucket 6 is automatically (forcibly) performed. When performing the closing operation of the bucket 6 automatically, the flow control valve 158 is switched to the left side position c by switching the solenoid proportional valve 158b to the left side position c by the controller 30.

The operation of the hydraulic circuits illustrated in FIGS. 14 through 16 are basically the same as the hydraulic circuits of the turning lever 26A and the boom lever 26B, and the descriptions thereof will be omitted.

Various operations can be performed in response to the positional relationship between the shovel and the entering object by combining the control operation of the boom 4 with the control operation of the arm 5 or the control operation of the bucket 6.

Moreover, in the above-mentioned embodiments, the "reverse control, "avoid control of the attachment 125", "grounding control of the attachment 125" and "pin insertion control" are illustrated and explained as the avoiding operation to avoid the shovel and the entering object from contacting with each other. However, the present invention is not limited to such a structure. For example, a braking may be applied to the upper turning body 3 by a mechanical brake 23 (refer to FIG. 5). Specifically, the mechanical brake 23 is released, while the upper turning body 3 is turning, by supplying the operating oil from the pilot pump 15 into the cylinder 23e. Then, the control signal is sent from the controller 30 in response to the degree of risk (urgency) of contact to switch the solenoid valve 50. Thereby, the supply of the operating oil into the cylinder 23e is stopped to actuate the mechanical brake 23, which results in braking applied to the upper turning body 3. Because braking is applied by the mechanical brake, time T to the stop of the turning operation of the upper turning body 3 is reduced as compared to the case where the flow of the operating oil is shut off by returning the turning lever to the neutral position. The time from the beginning of deceleration and the stop of the upper turning body 3 is substantially equal to the of the case where the "grounding control of the attachment 125" is performed (refer to the solid line and time T4 in FIG. 9).

The above mentioned control operations may be performed individually or some control operations may be combined. Thereby, the upper turning body 3 or the attachment 125 and the entering object are avoided from contacting with each other in response to various circumstances.

When combining some control operations, it is determined whether to control the attachment 125 or the turning hydraulic motor 21 based on a relative distance between the entering object and the components (the upper turning body, the attachment 125, etc.) of the shovel or a component of the shovel for which a possibility of contact with the entering object is high. This determination is performed by the determining part 30a of the controller 30.

Figure 17:
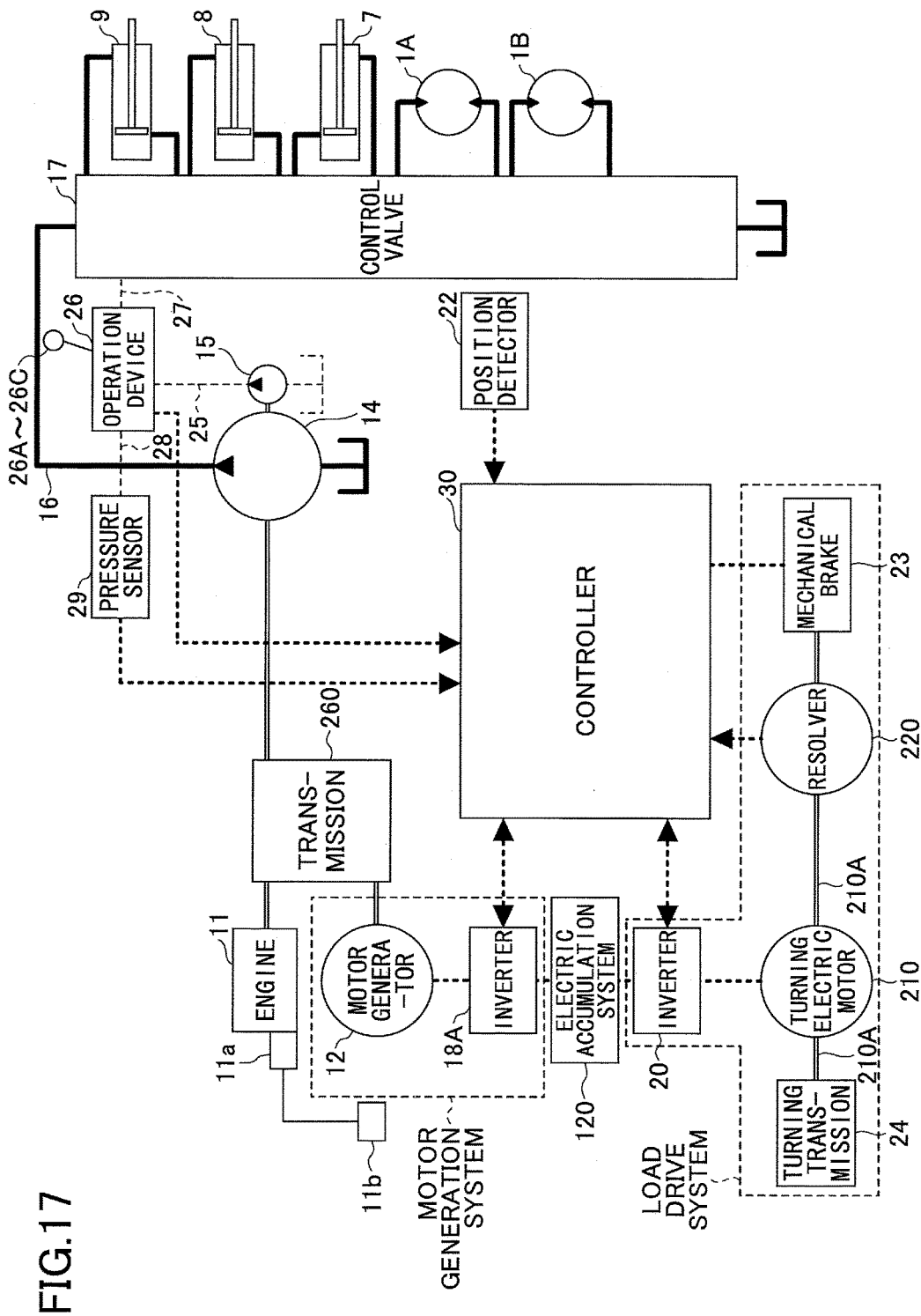
FIG. 17 is a block diagram of a structure of a drive system different from the drive system illustrated in FIG. 2.

The structure of the shovel according to the present invention is not limited to that illustrated in FIG. 2 in which the turning hydraulic motor is used as a turning motor. For example, the present invention can be achieved using a turning electric motor as illustrated in FIG. 17. In FIG. 17, double lines denote a mechanical drive system, bold solid lines denote high-pressure hydraulic lines, thin dashed lines denote pilot lines, and bold dotted lines denote electric drive/control lines.

The shovel illustrated in FIG. 17 uses an electrically operated turning mechanism 2, and is provided with a turning electric motor 210 for driving the turning mechanism 2. The turning electric motor 210 as an electric operation element is connected to an electricity accumulation system 120 through an inverter 20. A resolver 220, the mechanical brake 23 and a turning transmission 24 are connected to the rotation axis 210A of the turning electric motor 210. The turning electric motor 210, inverter 20, resolver 220, mechanical brake and turning transmission together constitute a load drive system.

The electricity accumulation system 120 including an electricity accumulator is connected to a motor generator 12 via an inverter 18A. The electricity accumulation system 120 is constituted by a voltage up-down converter connected by the inverters 18A and 20 and a direct current line and the electricity accumulator connected to the voltage up-down converter. A capacitor is used as the electricity accumulator. Instead of the capacitor, a rechargeable secondary battery such as a lithium ion battery, a lithium ion capacitor or an electricity exchangeable power source of other forms may be used as the electricity accumulator.

The engine 11 is provided with a starter motor 11a and a battery 11b for starting the starter motor 11a. The battery 11b is a battery generally used for a vehicle, and is, for example, a 24V lead storage battery. When starting the operation of the shovel, an electric power is supplied to the starter motor 11a to drive the starter motor 11a, and the engine 11 is forcibly rotated by the drive power of the starter motor 11a.

The shovel illustrated in FIG. 17 can provide the same action and effect as the shovel using the turning hydraulic motor 21.

Although the operation levers, which generate a pilot pressure as an operation signal to the flow control valve, is used in the above-mentioned embodiments, an electric lever, which generates an electric signal and sends the electric signal from the controller to the flow control valves 154, 155, 157 and 158, may be used other than the operation levers. In such a case, generally, the operation amount of the electric lever is input to the controller, and, thereafter, the electric signal corresponding to the operation amount is sent to the flow control valve to control the flow control valve. Additionally, if the controller detects an entering object, the electric signal sent from the controller is switched from the electric signal corresponding to the operation amount to the electric signal generated based on previously input signal patterns. Thus, the flow control valve is controlled base on the previously input signal patterns.

Moreover, although a position of the attachment 125 is calculated using the xyz-coordinate system in the above-mentioned embodiments, the present invention is not limited to the use of the xyz-coordinated system. For example, the coordinate may be defined by latitude and altitude using a global reference coordinate system. This is effective for a case where a position of an entering object is measured by GPS.

The present invention is not limited to the specifically disclosed embodiments using the above-mentioned shovel as an example, and various variations and modifications may be made without departing from the scope of the present invention.

What is claimed is:

1. A shovel, comprising:
   a lower running body;
   an upper turning body that is turnably provided on the lower running body;
   an engine that is mounted on said upper turning body;
   a hydraulic pump that is driven by the engine to discharge an operating oil;
   a turning hydraulic motor that is mounted on said upper turning body and configured to drive said upper turning body to rotate relative to said lower running body;
   a boom cylinder configured to control a boom;
   a flow control valve for turning motor, configured to control said turning hydraulic motor;
   a flow control valve for boom cylinder, configured to control said boom cylinder;
   a controller that controls operations of said shovel; and
   an object detection device that detects a position of an object in a monitoring area of said shovel,
   wherein said controller determines a degree of risk based on a distance between said object and said shovel after a determination of an entry of said object into said monitoring area, and causes the operating oil to be supplied from said hydraulic pump to said turning hydraulic motor or said boom cylinder by switching a spool position of said flow control valve for turning motor or said flow control valve for boom cylinder depending on said degree of risk, to avoid a contact with said object.

2. The shovel as claimed in claim 1, wherein when said controller causes the operating oil to be supplied from said hydraulic pump to said turning hydraulic motor, said controller sets said flow control valve for turning motor in a communicated state, after the determination of an entry of said object into said monitoring area, so as to supply the operating oil to a port of said turning hydraulic motor, which port is opposite to another port to which the operating oil is supplied before the determination of an entry of said object into said monitoring area.

3. The shovel as claimed in claim 1, wherein an attachment is mounted on said upper turning body, and said boom cylinder operates the attachment when the controller causes the operating oil to be supplied from said hydraulic pump to said boom cylinder, wherein said controller sets said flow control valve for boom cylinder in a communicated state, after the determination of an entry of said object into said monitoring area, so as to cause said attachment to contact with a ground or cause said attachment to be lifted.

4. The shovel as claimed in claim 1, wherein, after the determination of an entry of said object into said monitoring area, said controller sets said turning hydraulic motor or said boom cylinder in a state where operation of said turning hydraulic motor or said boom cylinder is irrelevant to an operation lever that is used to operate said turning hydraulic motor or said boom cylinder.

5. The shovel as claimed in claim 1, further comprising:
an attachment that is mounted on said upper turning body,
wherein said controller determines whether to control said attachment or to control said turning hydraulic motor based on a relative distance between said object and a component of said shovel.

6. A control method of a shovel comprising:
detecting a position of an object that has entered a monitoring area of said shovel by using an object detection device;
determining, by a controller, an entry of said object into said monitoring area based on a detection signal from said object detection device;
determining, by said controller, a degree of risk based on a distance between said object and said shovel after the determination of an entry of said object; and
supplying an operating oil from a hydraulic pump to a turning hydraulic motor or a boom cylinder by switching a spool position of a flow control valve for turning motor or a control valve for boom depending on said degree of risk to avoid a contact with said object, said flow control valve for turning motor being configured to control said turning hydraulic motor, said flow control valve for boom cylinder being configured to control said boom cylinder.

7. The control method as claimed in claim 6, wherein the supplying the operating oil from the hydraulic pump to the turning hydraulic motor or a boom cylinder is performed irrelevant to an operation by an operator to operate said hydraulic actuator.

* * * * *